US006400446B1

(12) United States Patent
Kashino et al.

(10) Patent No.: US 6,400,446 B1
(45) Date of Patent: Jun. 4, 2002

(54) THERMALLY DEVELOPING APPARATUS

(75) Inventors: Teruo Kashino; Akira Taguchi; Hirofumi Okabe; Yasuaki Tamakoshi; Masaya Shimoji, all of Sayama (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/518,778

(22) Filed: Mar. 3, 2000

(30) Foreign Application Priority Data

Mar. 11, 1999 (JP) .......................................... 11-064929
Oct. 22, 1999 (JP) .......................................... 11-300751

(51) Int. Cl.$^7$ .......................... G03B 27/00; G03B 27/32
(52) U.S. Cl. .......................................... 355/405; 355/27
(58) Field of Search ............................... 355/27–29, 40, 355/41, 405; 347/102, 212; 399/67, 69, 320, 328; 219/216; 430/350

(56) References Cited

U.S. PATENT DOCUMENTS 4,660,964 A * 4/1987 Yohsikawa et al. ........... 355/28
5,066,988 A * 11/1991 Miyake ...................... 355/245
5,128,709 A * 7/1992 Nagumo et al. .............. 355/27
5,801,360 A * 9/1998 Oba et al. .................... 219/216
6,007,971 A * 12/1999 Star et al. .................... 430/350

* cited by examiner

*Primary Examiner*—Russell Adams
*Assistant Examiner*—Hung Henry Nguyen
(74) *Attorney, Agent, or Firm*—Bierman, Muserlian and Lucas

(57) ABSTRACT

A thermally developing apparatus for thermally developing a thermally developable material by heating the thermally developable material to 80° C. or more, is provided with a thermally developing device having a heater and for thermally developing the thermally developable material with heat generated by the heater; and a controller to control heat generation by the heater; wherein the thermally developing device thermally develops the thermally developable material such that an amount M of heat given to the thermally developable material during thermally developing a single sheet of the thermally developable material satisfies the following formula for a maximum amount Hmax of heat generation of the heater:

$$0.07 \leq M/Hmax \leq 0.75$$

20 Claims, 10 Drawing Sheets

THERMALLY DEVELOPING APPARATUS

BACKGROUND OF THE INVENTION

This invention relates to a thermally developing apparatus and the thermally developing method, and in particular, to a thermally developing apparatus and the thermally developing method wherein image formation is carried out by holding a material to be developed by heat (hereinafter referred to as a thermally developable material) around the outer circumferential surface of a heated drum.

Thermally developing apparatus have been developed which is capable of forming a visible image from an image which has been formed as a latent image by continuously supplying a sheet-shaped thermally developable material to the outer circumferential surface of a heated drum to cause a thermal reaction to occur in this thermally developable material (refer to TOKUHYOHEI 10-500497 and TOKUHYOHEI 10-500506). According to these thermally developing apparatus, a sheet-shaped thermally developable material is supplied to the outer circumferential surface of a drum rotating at a constant rotational speed, and after the drum has rotated for a predetermined rotary angle with the thermally developable material being held, the thermally developable material is detached from the outer circumferential surface of the drum, while a new thermally developable material is simultaneously supplied to the circumferential surface of the drum; hence, it is possible to heat sheet-shaped thermally developable materials efficiently.

However, it has been proved that sometimes thermal development can not be enough made to reproduce the gradation suitably in a thermally developing apparatus, wherein a thermally developable material which comprises photosensitive silver halide particles, an organic silver salt, and a silver ion reducing agent, and is to be thermally developed at a temperature equal to or higher than the lowest development temperature, which should be higher equal to or higher than 80° C., is thermally developed by heat generated by a heater.

In respect of this, for example, in the description of TOKUHYOHEI 10-500497 and TOKUHYOHEI 10-500506, the relationship between the maximum amount of heat generation that the heater in the thermal development section can generate while a sheet of thermally developable material is thermally developed and the heat capacity of the thermally developable material is not concretely described.

Further, a thermally developable material which comprises photosensitive silver halide particles, an organic silver salt, and a silver ion reducing agent, and is to be thermally developed at a temperature equal to or higher than the lowest development temperature, which should be equal to or higher than 80° C., is easy to have a density unevenness owing to the non-uniformity of the temperature in the order of ±0.5° C., which is different from the case of a usual thermally developable material.

SUMMARY OF THE INVENTION

It is an object of this invention to make it possible to make a stable gradation reproduction at a low cost and simply by carrying out thermal development stably.

The above object can be attained by the following structures.

(1-1) A thermally developing apparatus for thermally developing a thermally developable material by heating the thermally developable material to 80° C. or more, comprises:

thermally developing means having a heater and for thermally developing the thermally developable material with heat generated by the heater; and a controller to control heat generation by the heater;

wherein the thermally developing means thermally develops the thermally developable material such that an amount M of heat given to the thermally developable material during thermally developing a single sheet of the thermally developable material satisfies the following formula for a maximum amount Hmax of heat generation of the heater:

$$0.07 \leqq M/Hmax \leqq 0.75$$

(1-2) In the thermally developing apparatus of (1-1), the thermally developing apparatus further comprises:

cooling means for cooling the thermally developing means.

(1-3) In the thermally developing apparatus of (1-2), the cooling means forcedly cools the thermally developing means.

(1-4) In the thermally developing apparatus of (1-1), the thermally developing means comprises a heating member heated by the heater and the thermally developing apparatus comprises temperature detecting means for detecting the temperature of the heating member, and wherein the controller controls heat generation of the heater in accordance with a temperature detected by the temperature detecting means.

(1-5) In the thermally developing apparatus of (1-4), the controller sets a target temperature for the heater and changes a set value of the target temperature in accordance with a timing when the thermally developing means develops the thermally developable material.

(1-6) In the thermally developing apparatus of (1-5), a set value of the target temperature for at least one heater provided to a region where all of the thermally developable materials passes is set higher at a timing when the thermally developable material is thermally developed than at the other timing.

(1-7) In the thermally developing apparatus of (1-5), a set value of the target temperature during a period from a time that a leading edge of the thermally developable material firstly comes in contact with the heating member to a time that a trailing edge of the thermally developable material firstly comes in contact with the heating member and a set value of the target temperature during the other period are smoothed by ramp processing.

(1-8) The thermally developing apparatus of (1-4), the heating comprises a metallic supporting member having a heating surface and the heater is a plane-shaped heater provided so as to come in close contact with a surface of the supporting member at a side opposite to the side of the heating surface.

(1-9) In the thermally developing apparatus of (1-4), the controller controls the heater by using at least one of a value corresponding to a time integral value of the temperature detected by the temperature detecting means.

(1-10) In the thermally developing apparatus of (1-4), wherein the controller controls the heater by using a value corresponding to a time differential value of the temperature detected by the temperature detecting means.

(1-11) In the thermally developing apparatus of (1-4), the heater is operated ON-mode or OFF-mode and the controller controls the heater by a duty ratio of the ON-mode to the OFF-mode.

(1-12) In the thermally developing apparatus of (1-4), the thermally developing means comprises a thermally developing section to thermally develop the thermally developable material, the thermally developing section has an inner section covered with a heat insulating member and the heater and the heating member are provided in the inner section.

(1-13) In the thermally developing apparatus of (1-4), the heating member is a rotating member which heats the thermally developable material while rotating on a condition that the thermally developable material is in close contact with a outer circumferential surface of the rotating member.

(1-14) In the thermally developing apparatus of (1-13), the rotating member is divided in the axial direction into plural regions and each of the plural regions is provided with the heater.

(1-15) In the thermally developing apparatus of (1-4), the thermally developing apparatus further comprises:

supplying means for supplying the thermally developable material to the heating member, and discharging means for discharging the thermally developable material from the heating member.

(1-16) In the thermally developing apparatus of (1-4), the heating member heats the thermally developable material with a development temperature higher than a lowest development temperature for a development time.

(1-17) In the thermally developing apparatus of (1-1), the thermally developing apparatus further comprises:

a rotatable roller urged onto the heating member.

(1-18) In the thermally developing apparatus of (1-1), an elastic layer having a thickness of 0.1 mm or more is provided on the surface of the heating member.

(1-19) In the thermally developing apparatus of (1-18), a ratio of a thermal conductivity to the thickness of the elastic layer is 0.15 (W/m/° K/mm) or more, and the heating member comprises a metallic supporting member to support directly or indirectly the elastic member.

(1-20) In the thermally developing apparatus of (1-19), the elastic layer has the thickness of 2 mm or less and the thermal conductivity of 0.3 W/m/° K or more.

(1-21) A thermally developing apparatus for thermally developing a thermally developable material, comprises:

thermally developing means having a heater and for thermally developing the thermally developable material with heat generated by the heater; and a controller to control heat generation by the heater;

wherein when the thermally developing means thermally develops a first thermally developable material having a largest width, the controller controls the heater such that an amount M1 of heat given to the first thermally developable material during thermally developing a single sheet of the first thermally developable material satisfies formula (1) for a maximum amount Hmax of heat generation of the heater during a developing time period for developing the first thermally developable material, and when the thermally developing means thermally develops a second thermally developable material having a smallest width, the controller controls the heater such that an amount M2 of heat given to the second thermally developable material during thermally developing a single sheet of the second thermally developable material satisfies formula (2) for a maximum amount Hmax of heat generation of the heater:

$$M1/Hmax \leqq 0.75 \quad (1)$$

$$0.07 \leqq M2/Hmax \quad (2)$$

(1-22) In the thermally developing apparatus of (1-21), the first thermally developable material has a heat capacity of a thermally developable material having the maximum heat capacity among thermally developable materials capable of being developed by the thermally developing apparatus and the second thermally developable material has a heat capacity of a thermally developable material having the minimum heat capacity among thermally developable materials capable of being developed by the thermally developing apparatus.

(1-23) In the thermally developing apparatus of (1-1) to (1-22), the thermally developing material is preferably a light sensitive material, especially a silver halide light sensitive material.

Further, the above object may be attained by the following preferable structures.

(2-1) The thermally developing apparatus of this invention is a thermally developing apparatus developing by heat (thermally developing) a thermally developable material which comprises photosensitive silver halide particles, an organic silver salt, and a silver ion reducing agent, and is to be thermally developed at a temperature equal to or higher than the lowest development temperature, which should be equal to or higher than 80° C., by heat generated by a heater, wherein the maximum amount of heat generation Hmax that is to be generated by the heater in the thermal development section and an amount of heat M given to the thermally developable material during thermally developing a single sheet of the thermally while a sheet of thermally developable material is thermally developed satisfy the following formula:

$$0.07 \leqq M/Hmax \leqq 0.75.$$

According to the above-described relationship 0.07≦M/Hmax, it can be carried out a control to make a stable gradation reproduction at a low cost, with a duty ratio which is not made too small, and simply; further, according to the above-described relationship M/Hmax≦0.75, the temperature of the thermally developable material is stabilized, to carry out enough thermal development to make it possible to have a stable gradation reproduction owing to a sufficient margin of the heater, even if there is the variation of heat amount with the passage of time which is taken by the thermally developable material from the thermal development section.

Further, from the above-described point of view, it is desirable that 0.10≦M/Hmax (in particular, 0.15≦M/Hmax), and it is desirable that M/Hmax≦0.5 (in particular, M/Hmax≦0.3).

Further, because the lowest development temperature is equal to or higher than 80° C., it is needless to say that thermal development can not substantially be made at a temperature equal to or lower than 40° C.

(2-2) The thermally developing apparatus of this invention is a thermally developing apparatus thermally developing a thermally developable material which comprises photosensitive silver halide particles, an organic silver salt, and a silver ion reducing agent, and is to be thermally developed at a temperature equal to or higher than the lowest development temperature, which should be equal to or higher than 80° C., by heat generated by a heater, said thermally developing apparatus further being capable of thermally developing thermally developable materials having different heat capacities respectively, wherein the maximum amount of heat generation Hmax that is to be generated by the heater in the thermal development section, an amount Mmax of heat given to the thermally developable material during thermally developing a single sheet of the thermally developable material having a largest width, and an amount Mmin of heat given to the thermally developable material during thermally developing a single sheet of the thermally developable material having a smallest width satisfy both of the following two inequalities:

$$Mmax/Hmax \leqq 0.75, \text{ and}$$

$$0.07 \leqq Mmin/Hmax.$$

According to the above-described relationship $0.07 \leqq Mmin/Hmax$, it can be carried out a control to make a stable gradation reproduction at a low cost, with a duty ratio which is not made too small, and simply; further, according to the above-described relationship $Mmax/Hmax \leqq 0.75$, the temperature of the thermally developable material is stabilized, to carry out enough thermal development to make it possible to have a stable gradation reproduction owing to a sufficient margin of the heater, even if there is the variation of heat quantity with the passage of time which is taken by the thermally developable material from the thermal development section.

Further, from the above-described point of view, it is desirable that 0.10 Mmin/Hmax (in particular, $0.12 \leqq Mmin/Hmax$), and it is desirable that $Mmax/Hmax \leqq 0.5$ (in particular, $Mmax/Hmax \leqq 0.3$).

(2-3) Further, by being equipped with a forced cooling means for compulsorily cooling the aforesaid thermally developable material, the thermally developing apparatus is capable of making a stable gradation reproduction owing to a temperature control being made easier against overheating.

(2-4) Further, it is desirable that, in the thermally developing apparatus comprising a heating member for heating the aforesaid thermally developable material being held by said heating member, temperature detecting means for detecting the temperature of said heating member, and temperature control means for controlling the aforesaid heater in accordance with the detected temperature, said heater is one for heating said heating member.

(2-5) Further, by making the target value of control for at least one of the portions of the aforesaid heater vary in accordance with the timing at which thermally developable materials are supplied, for example, by increasing the amount of heating by the heater while a thermally developable material is being supplied, and decreasing the amount of heating by the heater while no thermally developable material is being supplied, the temperature of the outer circumferential surface of the drum can be made uniform to the utmost, by which the unevenness of density can be suppressed.

(2-6) Further, regarding the target value of control for at least one of the portions of the heater provided in an area which all the thermally developable materials pass, if the value set in the time period substantially from the timing at which the leading edge of said thermally developable material first comes in contact with the aforesaid heating member to the timing at which the trailing edge of said thermally developable material first comes in contact with said heating member is made higher than the value set during the time period other than the above-described period, then the amount of heating by the heater is increased because the area which the thermally developable materials pass is cooled by them to produce a temperature drop while the thermally developable materials are being supplied, while the amount of heating by the heater is decreased while no thermally developable material is being supplied; thus, the temperature of the outer circumferential surface of the drum is made uniform to the utmost, by which the unevenness of density can be suppressed.

(2-7) It is desirable that, regarding the temperature control in which the value set in the time period substantially from the timing at which the leading edge of said thermally developable material first comes in contact with the aforesaid heating member to the timing at which the trailing edge of said thermally developable material first comes in contact with said heating member, and the value set during the time period other than the above-described period are made as target values, it is made smooth by ramp processing, by which a smoother temperature control becomes possible. In the above, the ramp processing means the processing which controls the temperature not to vary suddenly but gradually.

(2-8) Further, it is desirable that the aforesaid heating member comprises a supporting member made of a metal, and the aforesaid heater is a plane-shaped heater provided in contact with the opposite surface to the heating surface of said heating member; by using the above-described plane-shaped heater, it is possible to heat efficiently thermally developable materials which are supplied to said heating member, through said supporting member made of a metal having an excellent thermal conductivity.

(2-9) Further, it is desirable that the aforesaid temperature control means makes a temperature control using at least one of the value equivalent to the value integrated with time for the temperature detected by the aforesaid temperature detecting means, and the value equivalent to the value differentiated with time for the same; according to it, it is possible to make a control which converges the temperature rapidly to the target value.

(2-10) Further, it is desirable that the aforesaid temperature control means controls the aforesaid heater by a method of controlling the ON/OFF duty ratio, to make it possible to accomplish a control which has a simple structure and a good efficiency.

(2-11) Further, it is desirable that the aforesaid heating member and the aforesaid heater is provided in the thermal development section which is covered with a heat insulating member and heat-develops thermally developable materials by heating, because the heat dissipation from said heating member and said heater to the outside of said thermal development section can be suppressed, to make it possible to have a stable temperature control.

(2-12) Further, if the aforesaid heating member is a rotary member which carries out heating a thermally developable material held substantially in close contact with its outer circumferential surface while it is rotating, thermal development with a high efficiency can be accomplished, because thermally developable materials can be supplied continuously.

(2-13) Further, if the aforesaid portions of the heater are provided respectively in the plural areas formed by dividing the aforesaid rotary member in the direction of the axis of rotation, then the unevenness of density of the thermally developable materials can be suppressed regardless of the size, because the temperature of the aforesaid heating member can be adjusted in accordance with the thermally developable materials with a plurality of sizes having respectively different lengths in the direction of the axis of rotation of said rotary member.

(2-14) Further, it is desirable that the thermally developing apparatus further comprises supplying means for supplying a sheet-shaped thermally developable material to the aforesaid heating member, and ejecting means for ejecting a thermally developable material from said heating member.

(2-15) Further, if the aforesaid heating member is one that heats the aforesaid thermally developable material for a thermal development time at a development temperature which is equal to or higher than the aforesaid lowest development temperature, the generation of the unevenness of density can be suppressed, to obtain an image having a higher image quality.

(2-16) Further, if the thermally developing apparatus comprises rotatable rollers urged to the aforesaid heating member, by using these rollers, it is possible to make the aforesaid thermally developable material be in close contact with the outer circumferential surface of the drum.

(2-17) Further, if an elastic layer of a thickness equal to or larger than 0.1 mm is included in the surface portion of the aforesaid heating member, the condition of close contact between the thermally developable material and the heating member can be improved, to eliminate to the utmost portions of the thermally developable material which are not in contact with the heating member and are easy to have density unevenness.

(2-18) Further, if the ratio of the thermal conductivity to the thickness in the aforesaid elastic layer is equal to or larger than 0.15 (W/m/° K/mm), and the aforesaid heating member includes a supporting member made of a metal supporting said elastic layer directly or indirectly, then the heat of the heating member can be easily transferred to the thermally developable material owing to the good thermal conductivity, and an image having a suitable density can be obtained.

(2-19) Further, if the aforesaid elastic layer has a thickness equal to or larger than 2mm and a thermal conductivity equal to or higher than 0.3 (W/m/° K), then the unevenness of density can be suppressed, because the close contact condition and the thermal conductivity of the thermally developable material can be kept satisfactorily.

EXPLANATION OF THE TERMS

It is needless to say that the aforesaid "while a sheet of a thermally developable material is thermally developed" means "from the timing at which the leading edge of a sheet of thermally developable material first comes in contact with the aforesaid heating member to the timing at which the trailing edge of said sheet of thermally developable material first comes in contact with said heating member".

Further, it is needless to say that "the heat capacity M while a sheet of thermally developable material is thermally developed" means "the heat quantity which is taken by a sheet of thermally developable material while the sheet of thermally developable material is thermally developed".

Further, it is needless to say that "the maximum amount of heat generation Hmax that is to be generated by the heater in the thermal development section while a sheet of thermally developable material is thermally developed" means "the heat quantity generated under the condition that the heater in the thermal development section is let to generate heat at the maximum power during a time period equivalent to that while a sheet of thermally developable material is thermally developed". That is, the heat capacity M is an amount of heat which the developing means gives the thermally developable material.

DETAILED DESCRIPTION OF THE PREFERRED EMBODIMENT

Figure 1:
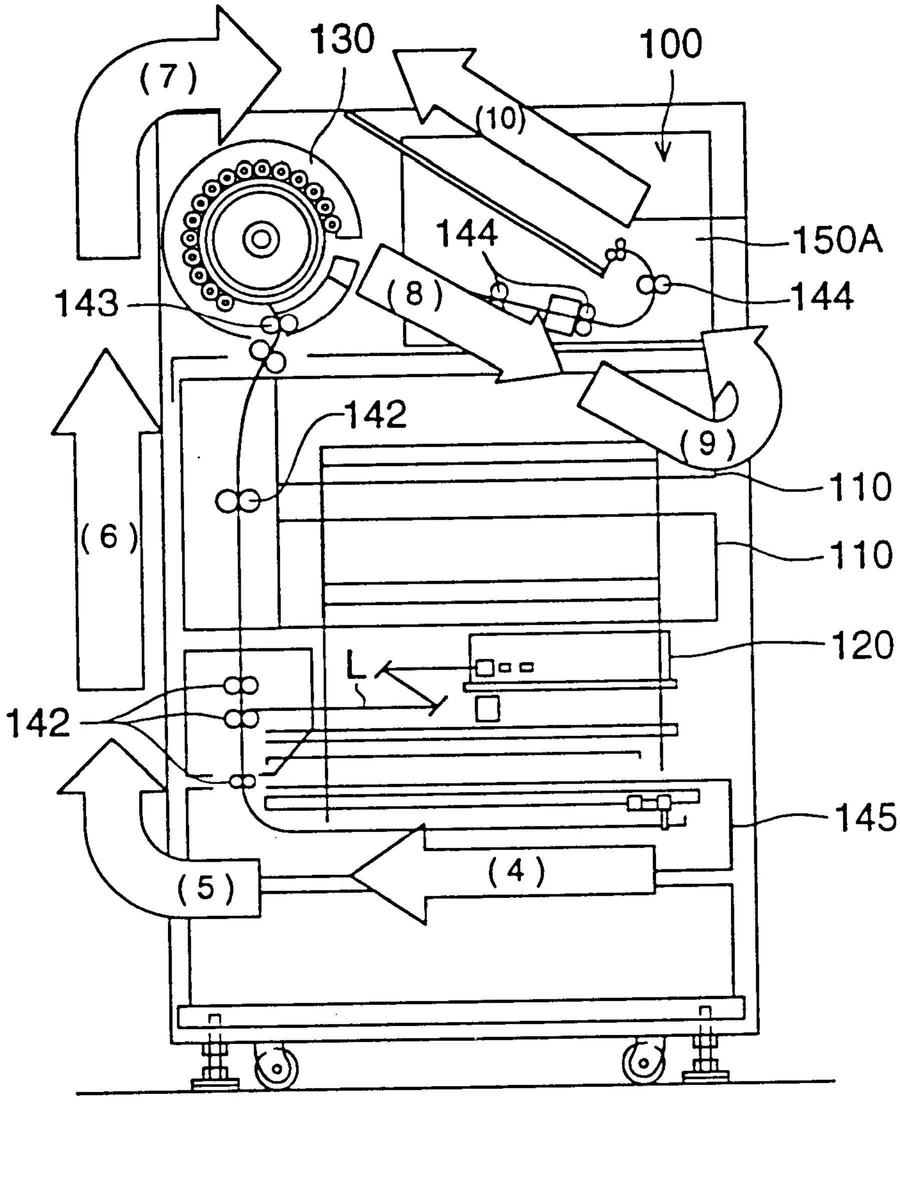
FIG. 1 is the front view of a thermally developing apparatus of an embodiment of this invention.
Figure 2:
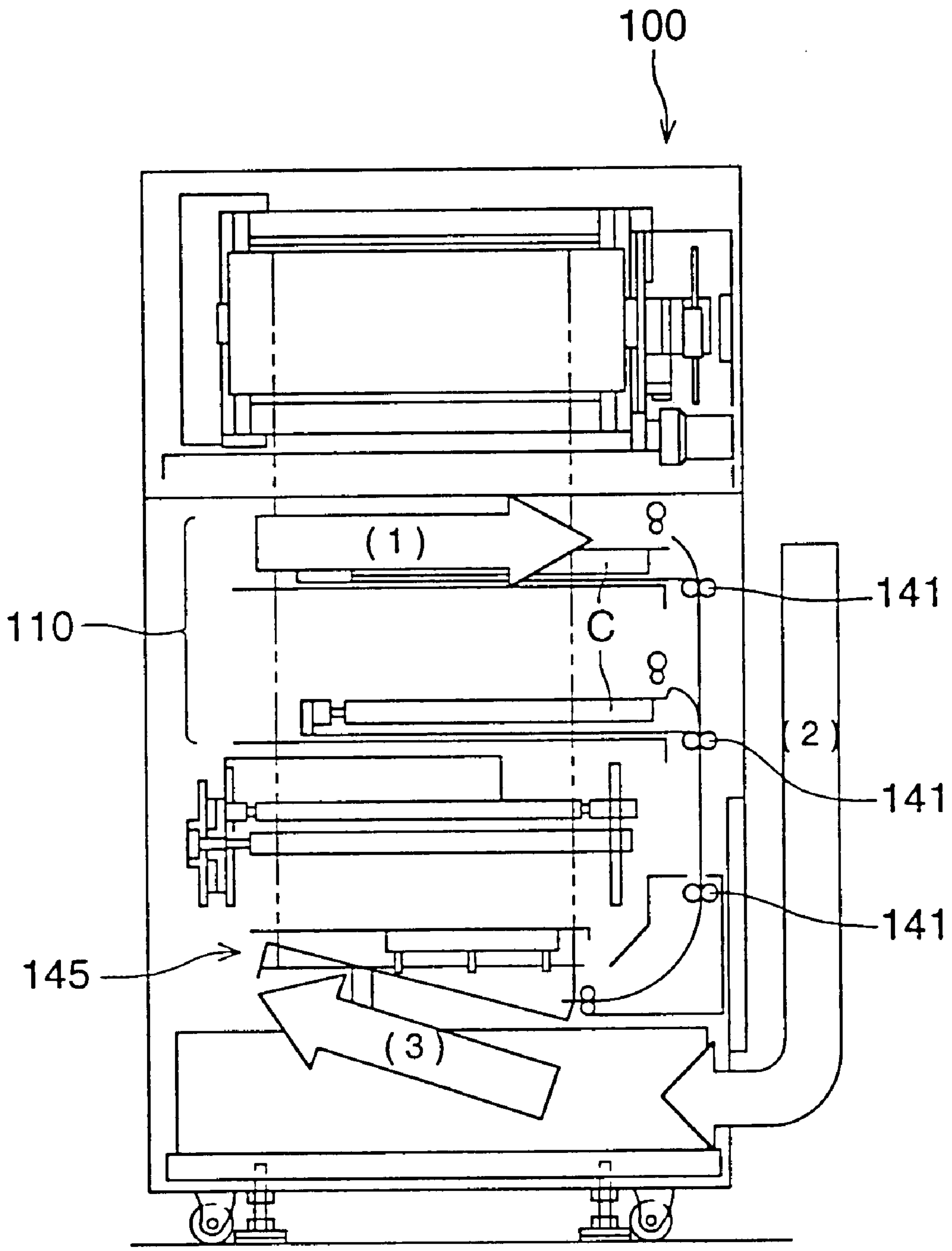
FIG. 2 is the left side view of a thermally developing apparatus of an embodiment of this invention.

In the following, an embodiment of the invention, which is an example of this invention, and an example of practice. Accordingly, it is needless to say that the meaning of the terms in the invention and the invention itself should not be construed with limitations by the description of the embodiment and the example of the invention, but it is possible that they are suitably altered or improved. FIG. 1 is the front view of a thermally developing apparatus of an embodiment of this invention, and FIG. 2 is the left side view of the above-mentioned thermally developing apparatus. The thermally developing apparatus 100 comprises the feeding section 110 which feeds the film F denoting a sheet-shaped thermally developable material shown in the example of practice one after another, the exposure section 120 at which a fed film F is exposed, and the development section 130 for developing an exposed film F. The operation of the thermally developing apparatus 100 will be explained with reference to FIG. 1 and FIG. 2.

In FIG. 2, the feeding section 110 is comprised of two stages, that is, the upper one and the lower one, and stores the film F received in the case C (refer to FIG. 3 and FIG. 4) together with the case C. By a taking-out device not shown in the drawing, the film F is taken out from the case C, and is drawn out in the direction of the arrow mark (1) in the drawing (in the horizontal direction). Further, the film F, which has been drawn out from the case C, is transported in the direction shown by the arrow mark (2) in the drawing (downward) by the transport device 141 composed of roller pairs 141.

The film F, which has been transported to the lower part of the thermally developing apparatus 100, is further transported to the transport direction converting section 145 located in the lower portion of the thermally developing apparatus, where it has its transport direction converted (from the direction of the arrow mark (3) in FIG. 2 to the direction of the arrow mark (4) in FIG. 1), and it is moved into the pre-exposure stage. Further, the film F is transported to the direction shown by the arrow mark (5) in FIG. 1 (upward) by the transport device 141 composed of roller pairs 142, and during the transporting, the film is exposed to the laser beam L having a wavelength in the infrared range of 780 to 860 nm, for example, 810 nm while being scanned.

Owing to the exposure to the laser beam L, a latent image is formed in the film F in a mode to be described later. After that, the film F is transported in the direction shown by the arrow mark (6) in FIG. 1 (upward), and at the timing when it has reached the supplying roller pair 143 denoting a supplying means, it is supplied to the drum 14 without stopping. That is, the films are supplied at random timings.

MODIFIED EXAMPLE 1

In the following, a modified example concerning the above-mentioned supply timings will be explained. By supplying the film F at a suitable phase in the rotation of the drum 14 through temporarily stopping it by the supplying roller pair 143 at the timing when it has reached the supplying roller pair 143, to make the amount of shift between the successively supplied films equal to or larger than 360/20=18 degrees, the temperature distribution on the outer circumferential surface of the drum 14 can be made uniform efficiently; owing to it, the non-uniformity of the temperature on the drum 14 in the direction of rotation is hardly produced, and the generation of the unevenness of density in the image can be effectively suppressed.

MODIFIED EXAMPLE 2

Further, as an modified example of the above modified example, the supplying means comprises the sensor 152 for detecting the leading edge of a film, the supplying roller pair 143 provided at the upstream side of the sensor 152 in the transport direction, the motor 151, and the control device 150 having a clock; when the sensor 152 detects the leading edge of the film F, the control device transmits drive signals with a definite time interval T satisfying all of the above-described equations 21 and 22 for an arbitrary natural number N on the basis of the times when the sensor 152 detected the passage of the leading edge of the film F the last time and the time before the last and the clock, and the supplying roller pair is let to be rotated until the sensor 152 detects the passage of the trailing edge of the film F. Further, in the cases other than the above, the rotation of the supplying roller pair 143 is stopped, and the film F, which has been transported from the lower transport portion 142 (FIG. 1) is temporarily stopped until the definite time interval T will have passed. Through the motion of the supplying roller pair 143 actuated by the rotation of the motor 151 in the above-described manner, the film F can be supplied to the drum 14. Besides, at some timings when the film F is transported to the roller pair 143, they are rotating.

Further, it is appropriate to make the structure as follows: In order that the succeeding film should not overlap the film which is still standing owing to the stop of rotation of the supplying roller pair 143, a sensor is provided before the exposure section 120; when the sensor detects that the leading edge of the succeeding film F is going to pass before the supply of the film F is started by the supplying roller pair 143, the transport roller pairs 142 are stopped in order to stop the succeeding film F.

In the above-described case, it is desirable to make the structure such that the feeding section is let not to start the feeding of the next one of the succeeding film F in order that the film should not supplied to the direction converting portion 145 until the succeeding film is supplied to the exposure section 120.

As described in the above, the control device 150 adjusts the supply timing of the film F to the drum 14 to shift the holding position of the film F suitably; hence, the dispersion of density of the image developed can be suppressed to the utmost.

Now, explanation of the modified examples has been completed.

Further, the drum 14 rotates in the direction of the arrow mark (7) in FIG. 1 with the film F held on the outer circumference of the drum 14. In this state, the film F is heated by the drum 14 for thermal development to form a visible image from a latent image in a mode to be described later. After that, when the film comes to the right side position of the drum by the rotation, the film F is detached from the drum 14 by using the guide member 202*a* denoting an ejecting means (FIG. 5), and after it is transported in the direction of the arrow mark (8) in FIG. 1 to be cooled, it is again transported in the directions shown by the arrow marks (9) and (10) in FIG. 1, to be ejected onto the output tray 160 in order that it may be taken out from on the thermally developing apparatus 100.

Figure 3:
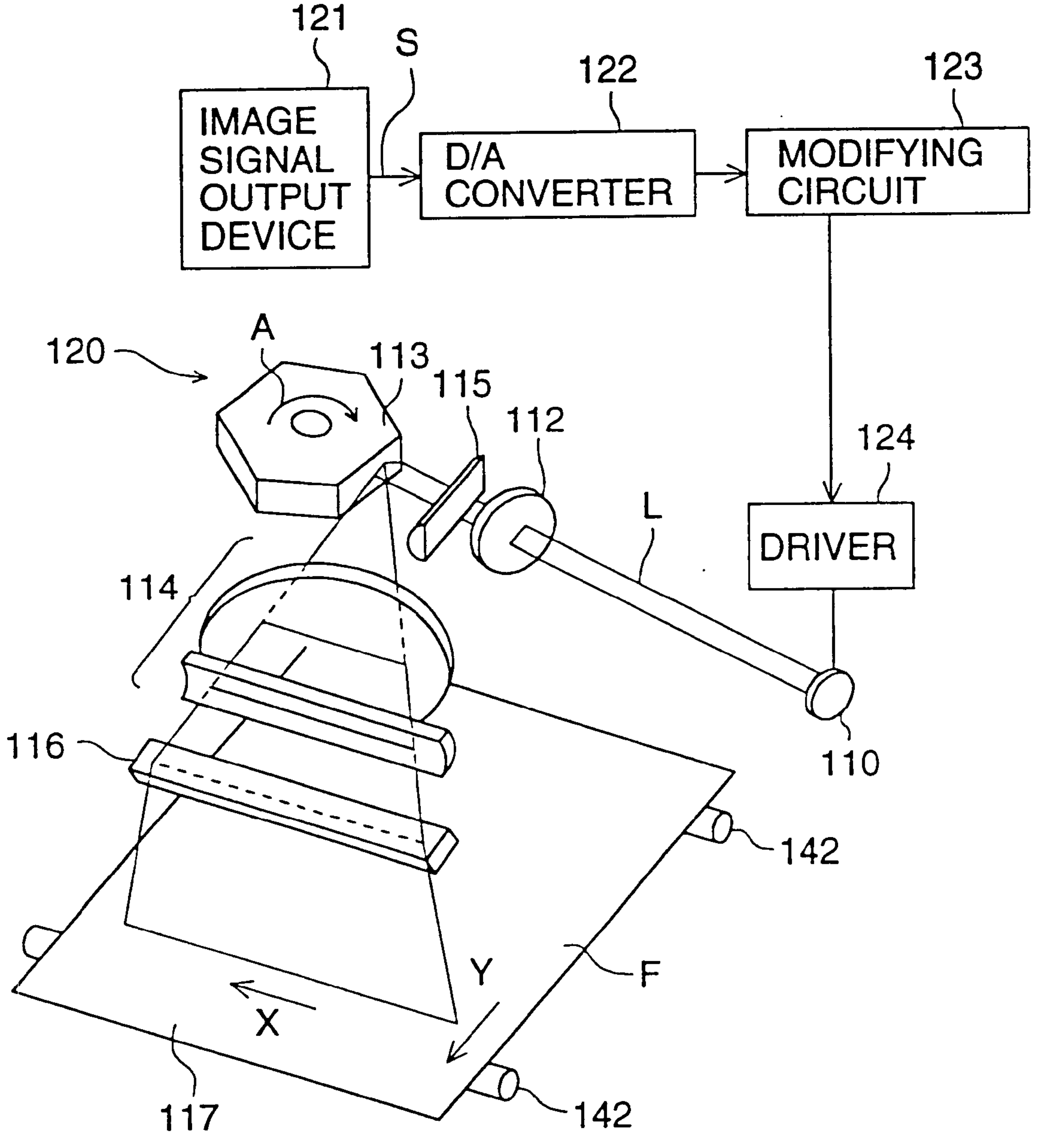
FIG. 3 is a drawing showing the outline of the structure of the exposure section 120.

FIG. 3 is a drawing showing the outline of the structure of the exposure section 120. The exposure section 120 makes main scanning on the film F by deflecting the laser beam L which has been modified in its intensity on the basis of the image signal S by the rotary polygonal mirror 113, while it makes sub-scanning by moving the film F relatively against the laser beam L in the direction approximately perpendicular to the main scanning direction, to form a latent image in the film F using the laser beam L.

In the following, more concrete structure will be described. In FIG. 3, the image signal S denoting a digital signal outputted from the image signal outputting device 121 is converted into an analogue signal, and inputted into the modifying circuit (modulating circuit) 123. The modifying circuit 123 has a structure in which the modified laser beam L is emitted from the laser light source portion 110 on the basis of the above-mentioned analogue signal by controlling the driver 124 in the laser light source portion 110.

The laser beam L, which has been emitted from the laser light source portion 110, is converged only in the vertical direction by the cylindrical lens 115, and comes incident on the rotary polygonal mirror 113 which is rotating in the direction shown by the arrow mark A in the drawing as a line image perpendicular to its axis of rotation. The rotary polygonal mirror 113 reflect the laser beam L to deflect it in the direction of main scanning, and the deflected laser beam L, after passing the fθ lens 114 including a cylindrical lens made up of a combination of two pieces of lens, is reflected by the mirror 116 provided on the optical path extendedly along the direction of main scanning, and makes main scanning repeatedly in the direction of the arrow mark X on the surface of the film F to be scanned which is being transported (being subjected to sub-scanning) in the direction of the arrow mark Y by the transport device 142. That is, the whole surface of the film F to be scanned is subjected to the scanning by the laser beam L.

The cylindrical lens in the fθ lens 114 is one converging the incident laser beam L on the surface of the film F to be scanned only in the direction of sub-scanning, and the distance from said fθ lens 114 to said surface to be scanned is made equal to the focal length of the fθ lens 114 as a whole. In this exposure section 120, the fθ lens 114 including the cylindrical lens and the mirror 116 are arranged in this manner, and the laser beam is let to be once converged on the rotary polygonal mirror 113 only in the direction of sub-scanning; hence, even if a tilt of reflection surface and a fluctuation of the axis of rotation occur in the rotary polygonal mirror 113, the scanning position of the laser beam L does not deviate in the sub-scanning direction, and the scan lines with a constant interval can be formed. The rotary polygonal mirror 113 has an advantage that it is superior to the other light deflecting devices such as a galvanometer mirror in the stability of the scanning. As described up to now, a latent image based on the image signal S is to be formed in the film F.

Figure 12:
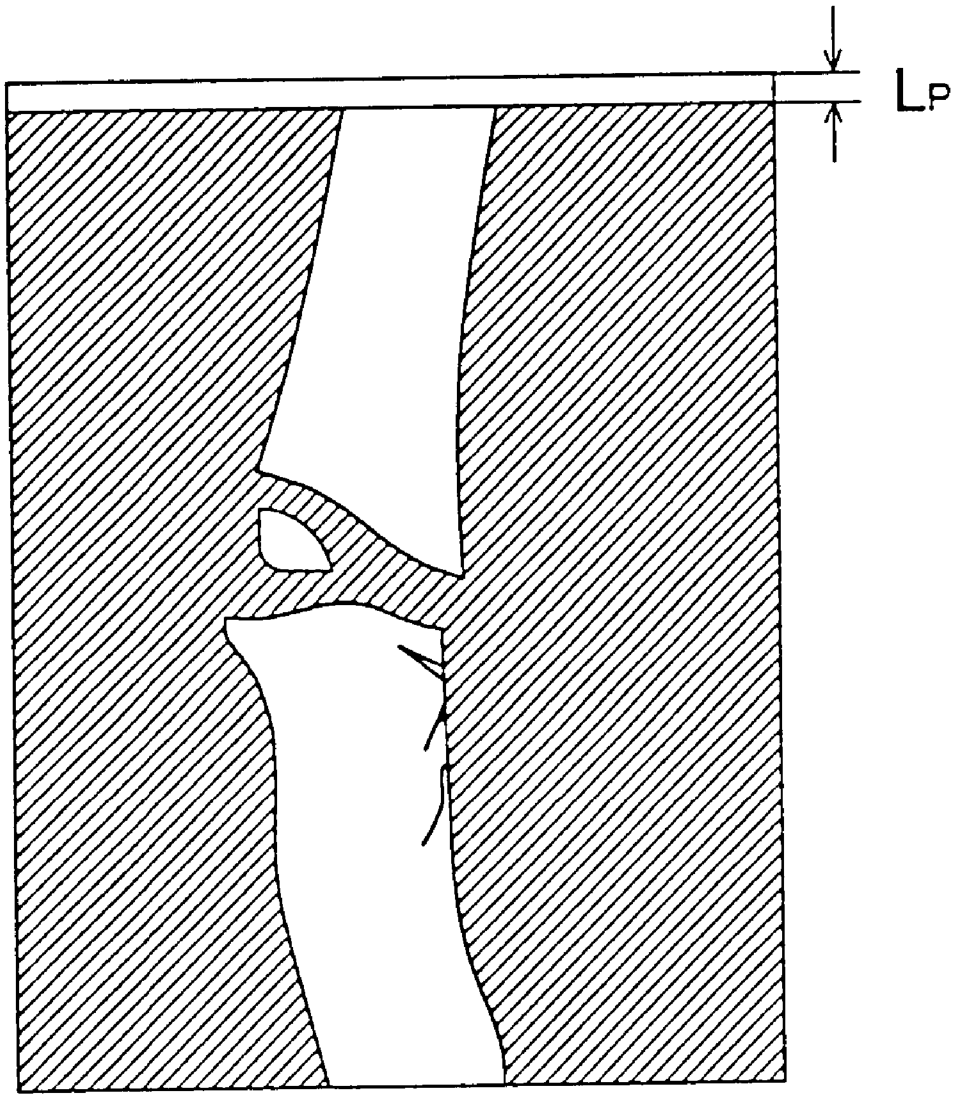
FIG. 12 is a drawing showing an example of the film F after thermal development.

Besides, because there is a problem that, if the leading edge of the film F is exposed, to form a silver image at the leading edge by the thermal development, the emulsion layer of the film F which has been weakened by the influence of the large grown up silver particles is peeled off in rushing into the roller pair or the detaching finger, the exposure section 120 does not the portion of length Lp from the leading edge of the film F in the transport direction as shown in FIG. 12 which shows the film F after thermal development. Owing to this, the occurrence of peeling off of the emulsion layer during thermal development and after thermal development can be suppressed. In addition, regarding the length Lp, if it is equal to or longer than 1 mm, the effect becomes remarkable, and the effect comes to saturation at 5 mm, hence, it is desirable to make the length Lp 1 to 5 mm. In this embodiment, it is made 3 mm.

Figure 4:
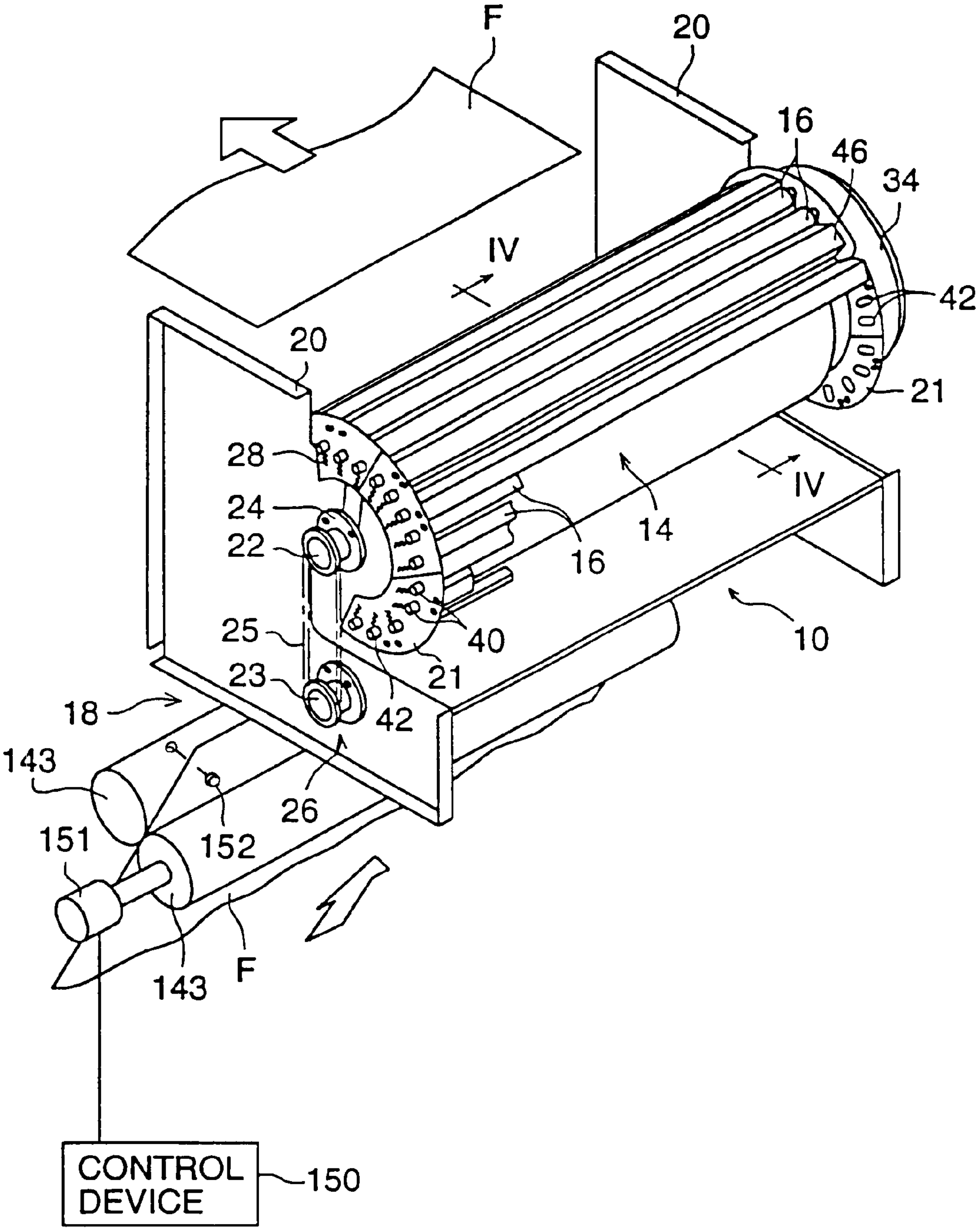
FIG. 4 is a drawing showing the structure of the development section 130 which heats the film F, and a perspective view of the development section 130.
Figure 5:
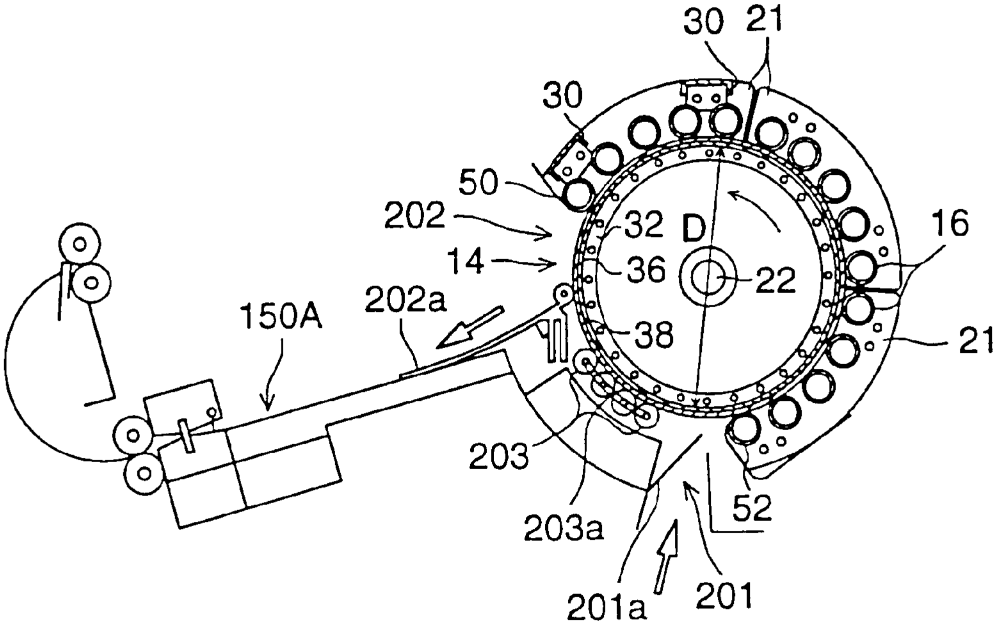
FIG. 5 is the cross-sectional view of the structure shown in FIG. 4 sectioned along the line IV—IV as seen in the direction of the arrow marks.
Figure 6:
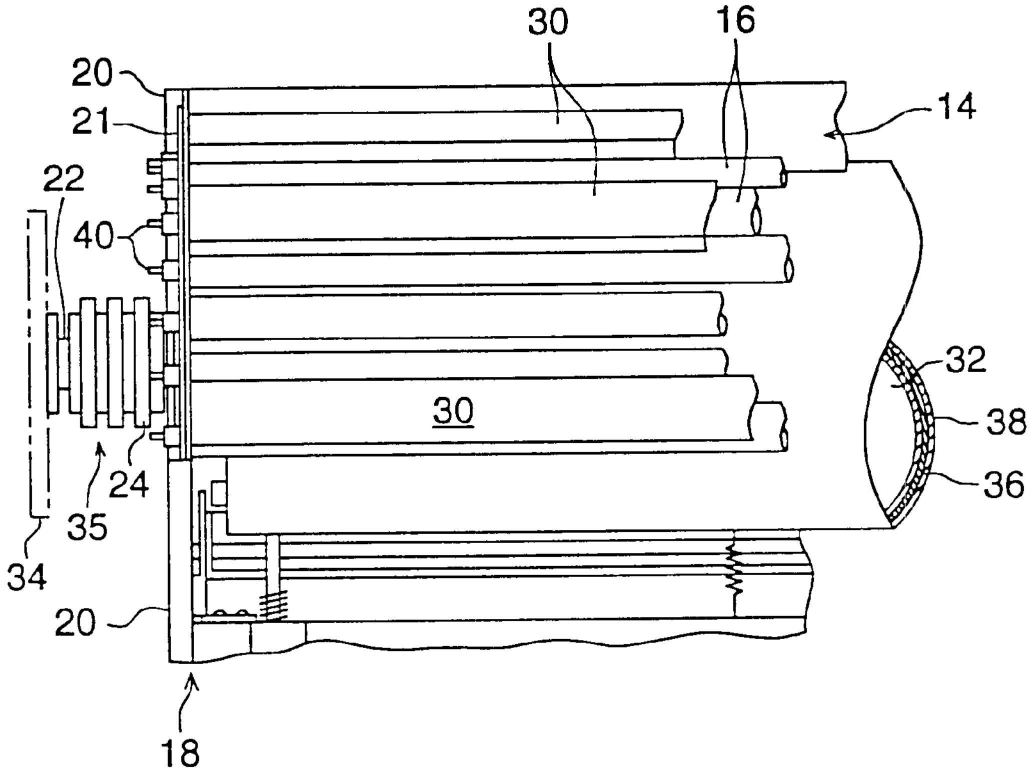
FIG. 6 is the front view of the structure shown in FIG. 4.

FIG. 4 to FIG. 6 are drawings showing the structure of the development section 130 which heats the film F. To state it more concretely, FIG. 4 is a perspective view of the development section 140, FIG. 5 is the cross-sectional view of the structure shown in FIG. 4 sectioned along the line IV—IV as seen in the direction of the arrow marks, and FIG. 6 is the front view of the structure shown in FIG. 4.

The development section 130 comprises the drum 14 which is capable of heating the film F while holding it on the outer circumference of the drum. The drum 14 has a function to form a visible image from a latent image formed in the film F by keeping the film F at a temperature equal to or higher than the predetermined lowest thermal development temperature for a predetermined thermal development time. In the above, the lowest thermal development temperature means the lowest temperature at which a latent image formed in the film F begins to be developed, and it is equal to or higher than 80° C. for the film in this embodiment. Here, a method of measuring the lowest thermally development temperature for a thermally developable material shaped in a sheet such as a film is explained.

(1) Conducts a wedge exposure for a thermally developable material being a object to be measured.

(2) Develops the exposed thermally developable material at a temperature t for a predetermined period of time.

(3) Cools the thermally developed material to an ambient temperature.

(4) Measure the density of the cooled thermally developed material.

Then, steps (1) to (4) are repeated while changing the temperature t at steps (2). In the thermally developed material developed at the temperature t, if a region having a density difference of 0.1 or more for the region exposed with the minimum amount of exposure exists, it deems that the thermally developed material was developed at the temperature t. Therefore, the lowest thermally development temperature means the temperature capable of obtaining the region having a density difference of 0.1 or more for the region exposed with the minimum amount of exposure.

On the other hand, the thermal development time means the time for which the film F is to be kept at a temperature equal to or higher than the lowest thermal development temperature in order to develop a latent image in the film F with desired development characteristics. In addition, it is needless to say that the film F can not be substantially developed at a temperature equal to or lower than 40° C.

Besides, the thermal development section 130 is built in the thermally developing apparatus 100 together with the exposure section 120 in this embodiment; however, it may be an apparatus which is independent of the exposure section 120. In this case, it is desirable that there is provided a transport portion for transporting the film F from the exposure section 120 to the development section 130. Further, it is desirable that the surrounding portion of the drum 14 is covered by a heat insulating material, because it makes the temperature control of the drum 14 easy to be carried out.

Around the outer circumference of the drum 14, there are provided 27 rollers 16 having a small diameter as guiding members, and they are disposed parallel to the drum 14 and at positions with equal intervals in the circumferential direction of the drum 14. At the both ends of the drum 14, there are provided three guiding brackets 21 for each side supported by the frame 18. In addition, by combining the guiding brackets 21, C shapes facing each other are formed at the both side portions of the drum 14.

Each of the guiding brackets 21 has nine long holes 42 formed extendedly in the direction of the radius. From these long holes 42, the shafts 40 provided at the both sides of the rollers 16 project. One end of each of the coil springs 28 is fixed to each of the shafts 40, and the other end of the coil spring is fixed to a position in the neighborhood of the inner circumference of the guiding bracket 21. Accordingly, each of the rollers 16 is urged to the outer circumference of the drum 14 by a predetermined force based on the urging force of each of the coil springs 28. When the film F enters between the outer circumference of the drum 14 and the rollers 16, it is pressed to the outer circumferential surface of the drum 14 by the above-mentioned predetermined force, and owing to it, the film F is heated uniformly over its whole area.

The shafts 22, which are linked to the drum 14 in a coaxial manner, are extended to the outside of the end portion members 20 of the frame 18, and are borne by the shaft bearings 24 to be rotatable against the end portion members 20. On the rotary shaft 23 of the micro-stepping motor (not shown in the drawing), which is disposed under one of the shafts 22 and fixed to one of the end portion members 20, a gear (not shown in the drawing) is formed. On the other hand, a gear is formed on the shaft 22. Through the timing belt (a belt having gear teeth formed on the inner side) 25, the driving force of the micro-stepping motor is transmitted to the shaft 22, and the drum 14 is rotated by it. In addition, the transmission of the driving force from the rotary shaft 23 to one of the shafts 22 may be done not through a timing belt but through a chain or gear train.

As shown in FIG. 5, in this embodiment, the rollers 16 are arranged over an angular range of about 234 degrees in the direction of circumference of the drum 14. The two reinforcing members 30 (FIG. 5 and FIG. 6) link the two end portion members 20 of the frame 18 to support additionally the both end portion members 20.

Figure 10:
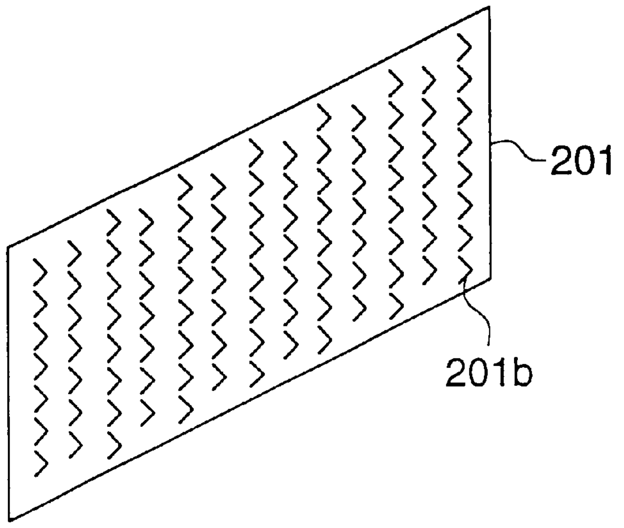
FIG. 10 is a perspective view of the guide member.

Further, the film F is introduced between the drum 14 and the first one of the rollers 16, being guided by the guide members 201 which are provided for the both sides, that is, the front side and the rear side of the film F. These guide members 201, as shown in FIG. 10 which is a perspective view of the guide member, have a number of projections with a rounded end 201*b* provided on the surface, and the film F is guided by these.

Owing to this, even if the vapor of the organic substances having a low boiling point in the film F, the vapor being vaporized in the neighborhood of the drum 14, attaches to the guide members 201, it is hardly transferred to the film F, to form a good image on the film F.

On the inner circumferential surface of the drum 14, the plate-shaped heater 32 is attached over the whole circumferential surface, and under the control of the electronic device for controlling 34 shown in FIG. 6, it heats the circumference of the drum 14. The supply of the electric power to the heater 32 is carried out through the slip-ring assembly 35 connected to the electronic device 34.

Besides, in this embodiment, in order to make compact the structure of the thermally developing apparatus 100, the drum 14 is made to have a rotatable cylindrical shape, but another structure may be employed as the means for heating the film F. For example, it is thinkable that the film F is placed on a belt conveyor equipped with a heater, and it is heated while being transported by such a conveyor.

As shown in FIG. 5, the drum 14 comprises the supporting tube 36 made of aluminum denoting a supporting member made of a metal and the soft layer (elastic layer) 38 which is attached directly or indirectly to the outside of this supporting tube 36. In addition, the soft layer 38 may be indirectly attached to the supporting tube 36. The supporting tube 36 in this embodiment is let to have the length of 45.7 cm, the thickness of 0.64 cm, and the outer diameter of 16 cm.

Further, it is desirable that the unevenness of the thickness of the supporting tube 36 is let to be within 4%, for example. Moreover, the soft layer 38 is made to have an enough smooth surface in order to improve the condition of close contact with the film F, and it is desirable that the surface roughness Ra of the surface is smaller than 5 μm (in particular, 2 μm).

However, the surface roughness Ra concerning certain materials such as one having a silicone rubber for the base material should be equal to or larger than 0.3 μm in order to prevent the adhesion of the film F to the drum 14. Besides, if the surface roughness is equal to or larger than 0.3 μm, gases, especially volatile substances are made easy to be exhausted from between the soft layer 38 and the film F.

The soft layer 38 has a sufficient thermal conductivity equal to or higher than 0.3 W/m/° K, and owing to this, the temperature of the outer circumferential surface of the drum 14 can be kept uniform. Besides, in this embodiment, the thermal conductivity of the soft layer is let to be equal to or higher than 0.4 W/m/° K.

Owing to using the soft layer 38, the film F is made to be in more reliable contact with the drum 14 by the rollers 16 without lowering the wear resistance. It is desirable that the soft layer 38 has a Shore A hardness equal to or lower than 70 (in particular, 60) measured by a durometer. In this embodiment, the Shore A hardness measured by a durometer is equal to or lower than 55.

Further, in certain materials, some additive for making the thermal conductivity high and a silicone rubber are included, and it is found out that such substances are especially useful for forming the soft layer 38. Although the thermal conductivity of a silicone rubber included in such a material is comparatively low, the pressing performance against the film F and the durability (wear resistance) against the film F are improved.

On the other hand, in order to improve the processing capacity in development, it is necessary to make the thermal conductivity high, and the above-described additive in certain materials contribute to keeping the thermal conductivity high. However, in the material forming the soft layer 38, if the amount of the additive is increased, the pressing performance by the silicone rubber and the durability are lowered; hence, the amount of the additive and the silicone rubber should be optimized within a certain range. Besides, a material including a silicone rubber has an advantage that it is easy to be detached from the film F and is chemically inactive.

It is desirable that the thickness of the soft layer 38 falls within the range from 0.1 mm to 2 mm, and it is possible to use a thinner soft layer than the above-described one; however, there is a problem that the thinner it is made, the lower the function of the soft layer 38 becomes and the more difficult the manufacturing of it becomes. Therefore, it is desirable that the thickness of the soft layer 38 is equal to or larger than 0.4 mm. Further, it is desirable that the dispersion of the thickness of the soft layer 38 is equal to or smaller than 20% (in particular, equal to or smaller than 10%). In this embodiment, it is suppressed to a value equal to or smaller than 5%. Besides, the ratio of the thermal conductivity to the thickness in the soft layer 38 should desirably be equal to or larger than 0.15.

In this embodiment, for the guiding members, the rotatable rollers 16 are used; however, it is possible to use other means such as a small movable belt. In this embodiment, for the rollers 16, tubes made of aluminum having the outer diameter of 1 to 2 cm and the thickness of 2 mm are used. Owing to the rollers being hollow, suppression of the heat conduction is helped, by which the thermal influence of the rollers 16 can be eliminated to the utmost. However, if the first roller in the rollers 16 which first comes in contact with the supplied film F is not made hollow, but is formed of a solid or a hollow but some-material-filled cylinder, the temperature decrease through the heat being taken by the film F in contact becomes difficult to occur owing to the roller having a comparatively large heat capacity; thus, for example, it can be suppressed an unevenness of density such that the image density is different between the portion near the leading edge of the film and portion near the trailing edge of the film.

Further, as described in the above, the urging force of the coil springs 28 is one to determine the pressing force of the rollers 16 to a value such that the film F can be subjected to a sufficient heat transfer through becoming in more reliable contact with the outer circumferential surface of the drum 14; hence, it is necessary to give enough attention to the selection of the value. If the urging force of the coil spring 28 is too small, there is the possibility that the development of an image becomes incomplete because of the heat not uniformly conducting. Accordingly, it is desirable that the urging force from the roller 16 per width of 1 cm of the film F is equal to or larger than 3 g (in particular, equal to or larger than 5 g). Further, if the urging force from the roller 16 per width of 1 cm of the film F is too smaller than 14 g, it occurs the possibility that the rollers 16 do not rotate following the rotation of the drum 14. In particular, if the urging force is equal to or smaller than 7 g, the rollers do not rotate with the drum. In such cases, if the film F is moved with the rotating drum 14 and the rollers 16 are in contact with the film F, there is the possibility that the film F is damaged by the rollers 16. In such cases, it is desirable that driven rotary portions are provided at the both ends of these rollers, and the rollers 16 are rotated by gear driving or friction driving through these driven rotary portions.

On the other hand, the urging force of the coil spring 28 should be small to a degree such that the rollers 16 do not produce traces by pressing.

Accordingly, it is desirable that the urging force from the roller 16 per width of 1 cm of the film F is equal to or smaller than 200 g (in particular, equal to or smaller than 100 g). In this embodiment, this force per 1 cm in the direction of the width of the film F is between 5 g and 7 g. In addition to it, driven rotary portions are provided at the both ends of the rollers 16, and the rollers are driven to rotate by gear driving through these driven rotary portions, to keep the force in the above-described range; hence, the harmonization of the decreasing the traces by pressing and the decreasing of the unevenness in the image can be secured.

Besides, it is suitable to determine the urging force by the every coil spring 28 when they are used for the rollers 16 provided around the cylindrical drum 14 by taking into consideration the gravity acted on the every roller 16. For example, if the urging force of a coil spring 28 urging a roller 16 which is located at the upper side of the drum 14 is made smaller in accordance with the weight of the roller 16 than that of another coil spring 28 urging a roller which is located at the bottom side of the drum 14, approximately the same pressure can be acted for the whole area of the film F.

In addition to the force acted by the every roller 16, the space between the neighboring rollers 16 is important for making a high-quality image formation in the film F. When the film F is supplied to the drum 14, its temperature is generally the room temperature (about 20° C.). Accordingly, in order to make the processing capacity of the development section 130 be the maximum limit, the film F should be rapidly heated from the room temperature to the lowest thermal development temperature required for starting the development (124° C. in this embodiment).

However, there is a possibility that a substrate material which is included in a certain kind of the film F, for example, a plate material having polyester film as the base, or a plate material having other thermoplastic material as the base makes thermal expansion or contraction (diminish in size) when it is heated. Accordingly, in order to make the variation of size uniform to prevent the formation of creases (folds), the film F must be heated uniformly while it changes alternately the condition between the flat-held condition and the non-constrained condition. In order to actualize this, the plural rollers 16 are arranged with a spacing such that the variation of the area (domain) of the film F located between the neighboring rollers 16 can be allowed, when the film F is not constrained between the rollers 16 and the drum 14.

However, as described in the above, in order to conduct heat sufficiently and uniformly for the uniform development of the film F, the rollers 16 must be held for a predetermined time in the condition of holding the film F being urged to the drum 14. As the result of this, the space located between the neighboring rollers 16 is to be selected to be a value such that the creases (folds) is made minimum and the heating of the film F is carried out rapidly and uniformly.

Further, on the outer circumferential surface of the cylindrical drum 14, the leading edge portion of the film F extends in the direction of the tangent of the drum 14 between the neighboring rollers owing to its own rigidity; hence, in order to suppress this, the rollers must be enough close to one another. Such arrangement is important for holding the film F between the rollers 16 and the drum 14.

As shown in FIG. 4 to FIG. 6, the 27 rollers 16 are disposed over the angular range of 234 degrees in the direction of rotation of the drum 14, and every distance between the centers of the neighboring rollers is 9 degrees. This structure acts effectively for the comparatively hard film F such as a film comprising the base having a thickness in the range from 0.1 mm to 0.2 mm, for example, a polyester film comprising the base having the thickness of 0.18 mm, and for the film F with a smaller hardness such as a polyester film comprising the base having the thickness of 0.10 mm in the case that the diameter of the drum 14 is 15 cm to 30 cm and the diameter of the roller is 1 cm to 2 cm.

The heater 32 is attached to the inner circumference of the drum 14 in order to heat the outer circumferential surface of the drum 14. For the heater 32 for heating the drum 14, a resistive foil heater which is made by etching can be used.

The electronic device 34 for controlling the heater as a temperature control means is capable of adjusting the electric power supplied to the heater 32 in accordance with the temperature information sensed by the temperature sensors S1 to S4 as temperature detecting means (FIG. 9) which rotate with the drum 14 and are disposed in the drum 14. The detail of the temperature control will be described later. The adjustment of the temperature of the outer circumferential surface of the drum 14 can be made by the heater 32 and the electronic device 34 for controlling the heater in order to make the temperature suitable for the development of the particular film F. In this embodiment, the drum 14 can be heated to a temperature in the range of 60° C. to 160° C. by the heater 32 and the electronic device 34 for controlling the heater.

In the above, it is desirable that the temperature variation in the direction of the width of the drum 14 (the axial direction of the drum 14) is kept within the range of 2.0° C. (in particular, within the range of 1.0° C.) by the heater 32 and the electronic device 34 for controlling the heater. In this embodiment, it is kept within the range of 0.5° C.

The undeveloped film F which has been supplied from the supply roller pair 143 at the predetermined timing is supplied to the nip portion 52 which is formed by the heating member (drum) 14 and the roller 16 located at the most upstream side in the development section 130. Next, the film F revolves with the drum 14. At this time, the film F is urged to the drum 14 by the rollers 16, and is made to be in contact with the outer circumference of the drum 14 for a predetermined time during revolution.

Because the drum 14 can move at an approximately equal speed to the film F which is being developed, there is a low possibility that the surface of the film F is damaged; owing to this, a high quality image can be secured. The film F, which has been developed while being transported between the drum 14 and the rollers 16, is guided to the nip portion formed by the roller 16 which is located at the most downstream side and the drum 14, and is drawn out from the drum 14 in the development section 130.

The development section 130 has a structure such that the various kinds of films F composed of a polyester base etc. coated, for example, with a photosensitive thermal development emulsion layer including infrared sensitive silver halide as shown in the example of practice can be developed. The drum 14 is kept at a temperature between 115° C. and 138° C. during the thermal development, for example, at 124° C., and said drum 14 is rotated at a speed such that the film F is held for 15 seconds on its outer circumferential surface in the condition of close contact, which is the predetermined time. That is, the temperature of the film F can be raised to 124° C. with this predetermined time and the above temperature, for example, by keeping the drum temperature at 124° C.

The thickness and the thermal conductivity of the soft layer 38 are selected in order that the continuous processing of a plurality of sheets of the film F may be efficiently carried out. Of course, these parameters can be varied in accordance with the characteristics of the film F to be developed and the desired process capacity. For example, the temperature and the rotational speed of the drum 14 can be varied like the predetermined time for which the film F is in contact with the drum 14, in order to develop the films F having different necessary conditions concerning development.

Further, like the drum 14, the rollers 16 can be provided with a soft layer. In other case, instead of providing a soft layer on the rollers 16, the drum 14 can be provided with an outer layer which is not softer. Further, it is possible to make a structure wherein the drum 14 is substituted by rotary rollers and a cylindrical drum or a supported flat endless belt functions as the rollers 16.

It is desirable that the surface at the side of the photosensitive thermal development emulsion layer of the film F is contact with the outer circumferential surface of the drum 14 (the soft layer 38 in this embodiment). However, the opposite side of the film F may be brought in contact with the outer circumferential surface of the drum 14 (the soft layer 38 in this embodiment).

Next to the thermal development of the image, the film F is detached from the surface of the drum 14 in the development section 130 by the detaching member 202*a*, and is guided to the direction apart from the surface of the drum 14; after that, it is guided to the direction of the cooling device 150A. By cooling the film after the development in the above manner, there is a low possibility of the film being damaged and also of the surface being worn. Further, the developed film F is first gradually cooled and later rapidly cooled in the cooling device.

Figure 11:
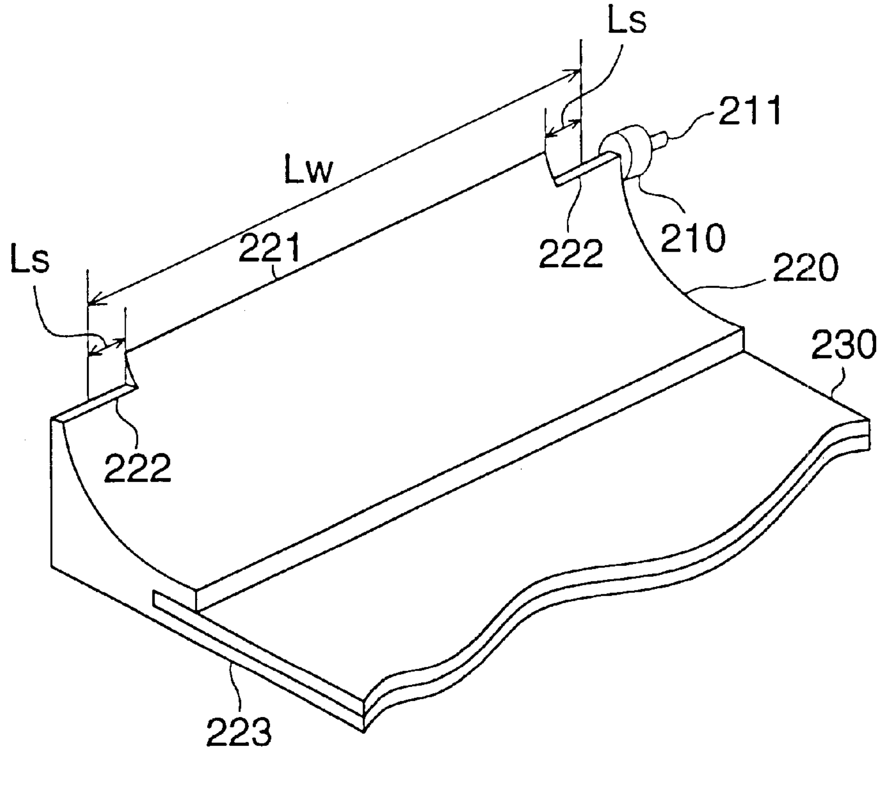
FIG. 11 is a perspective view of the detaching member.

In the following, this detaching member 202*a* will be explained with reference to FIG. 11 which is a perspective view of it. The edge 221 of the detaching member 202*a* has a sharpened cross-section and keeps a predetermined spacing to the outer circumferential surface of the drum 14 by the rolling spacer bars 210 provided at the both sides of the leading edge of the detaching member 202*a*. It is desirable that this predetermined spacing falls within the range of 0.2 to 0.8 times the thickness of the film to obtain a good detaching capability.

Further, it is desirable that the leading edge 221 of the detaching member 202*a* has a length which is smaller by 0.3 to 3 cm per each side than the width of the film F Lw (cm) which is the size in the direction (axial direction of the drum 14) perpendicular to the transporting direction, because the film piece of the film F beginning to detach from its both side ends do not adhere to the leading edge 221 of the detaching member 202*a*, and because it is prevented that the both ends of the film F in the direction perpendicular to the transporting keep adhering to the surface of the drum 14 to cause the film F not to be detached by the detaching member 202*a*, or it is deformed even though it is detached. Besides, the leading edge 221 of the detaching member 202*a* in this embodiment has a length smaller by Ls=1 cm per each end of the film F in the direction perpendicular to the transporting.

The size of the detaching member 202*a* in the part other than the leading edge portion in the direction perpendicular to the transporting is larger than the size of the film F in the direction perpendicular to the transporting.

Further, the front portion 220 near the leading edge 221 of the detaching member 202*a* is form ed of a member having a high thermal conductivity, to make the film F be cooled rapidly to stop the thermal development at the predetermined thermal development time. Further, successively behind the front portion 220, there is provided the heat insulating portion 230 formed of a non-woven fabric, in order that the cooling speed may be lowered before the film F is cooled to under the glass transition temperature, and that the film F may be cooled to under the glass transition temperature in a condition of its radius of curvature being made large.

Figure 7:
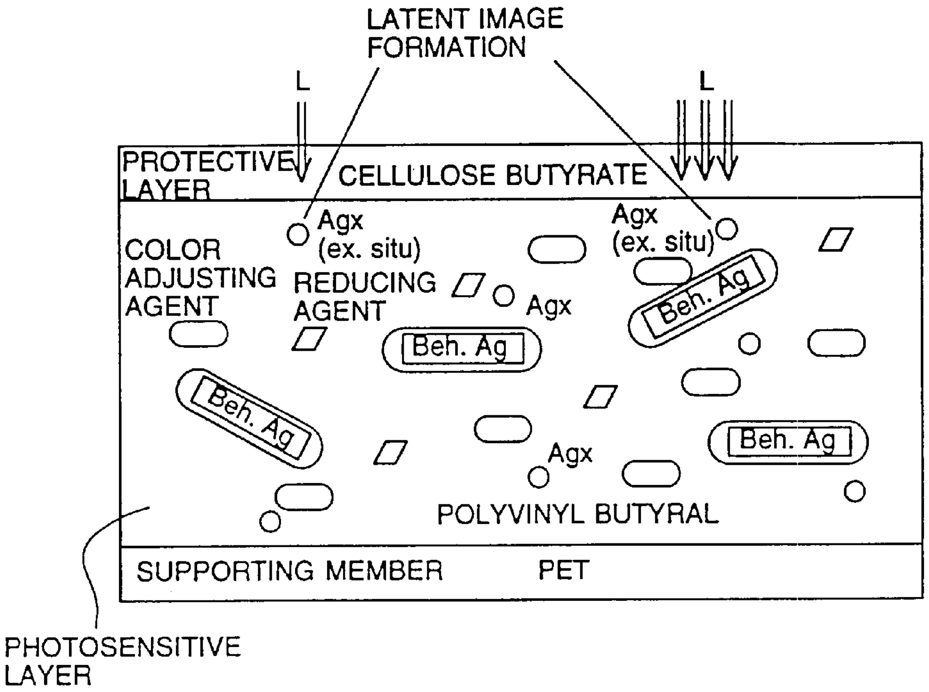
FIG. 7 is a cross-sectional view of the film F, and is a drawing showing schematically the chemical reaction in the film F at the time of exposure.
Figure 8:
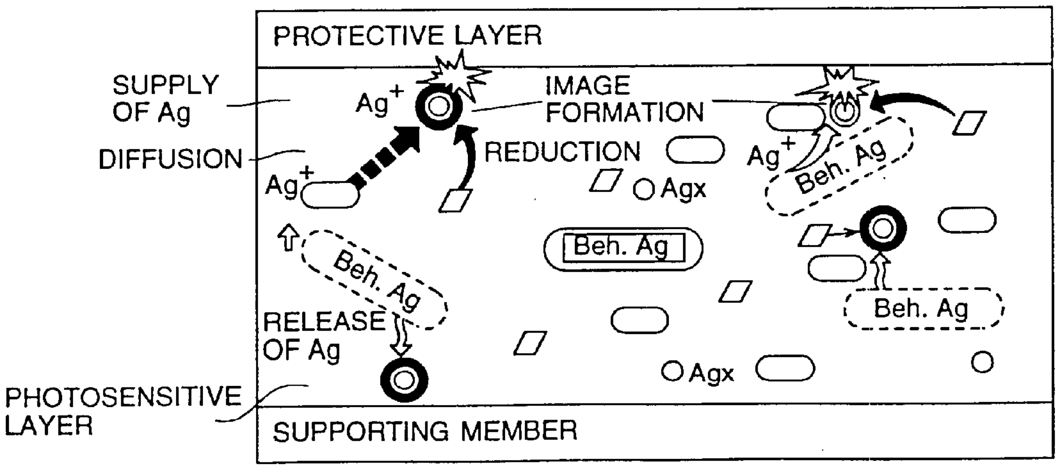
FIG. 8 is a cross-sectional view similar to FIG. 7 showing schematically the chemical reaction in the film F at the time of heating.

FIG. 7 is a cross-sectional view of the film F shown in the example of practice, and is a drawing showing schematically the chemical reaction in the film F at the time of exposure. FIG. 8 is a cross-sectional view similar to FIG. 7 showing schematically the chemical reaction in the film F at the time of heating. The film F has a photosensitive layer mainly composed of a polyvinylbutyral formed on a supporting member (base layer) composed of a PET, and further a protective layer composed of a cellulose butyrate formed on them. In the photosensitive layer, there are mixed silver behenate (Beh. Ag), a reducing agent, and a color adjusting agent.

At the time of exposure, when the laser beam L irradiates the film F from the exposure section 120, as shown in FIG. 7, the silver halide particles receive the light to form a latent image in the area irradiated by the laser beam L. Further, it seems that when the film F is heated to reach the thermal development temperature or higher, as shown in FIG. 8, silver ions ($Ag^+$) are released from silver behenate, and the behenate which have released silver ions form a complex compound with the color adjusting agent, and that the silver ions diffuse after that, and a latent image is formed by a chemical reaction through the action of the reducing agent with the silver halide particles which have sensed the light made as nuclei. As described in the above, the film F has a structure such that it includes photosensitive silver halide particles, organic silver salt, and a silver ion reducing agent, and is not thermally developed substantially at a temperature equal to or lower than 40° C., and is thermally developed at a temperature equal to or higher than the lowest thermal development temperature, namely, 80° C.

Incidentally, in a thermally developable material which includes photosensitive silver halide particles, organic silver salt and a silver ion reducing agent, is not thermally developed substantially at a temperature equal to or lower than 40° C. and is thermally developed at a temperature equal to or higher than the lowest thermal development temperature 80° C., it has been found occasionaly that the above thermally developable material may not be sufficiently thermally developed to be unable to obtain a suitable gradation reproduction, by the conventional thermally developing apparatus for carrying out thermal development by heat generated by a heater.

According to the study of the inventors, it has been found out that a thermally developable material, which includes photosensitive silver halide particles, organic silver salt, and a silver ion reducing agent, and is not thermally developed substantially at a temperature equal to or lower than 40° C., and is thermally developed at a temperature equal to or higher than the lowest thermal development temperature, has a variation in the amount of heat with the laps of time, which the thermally developable material takes from the thermal development section, with the passage of time, in accordance with the lot, storage condition in terms of the passage of time, and the difference in the size, and if the heater has not a sufficient margin, the temperature of the thermally developable material is lowered, which causes the thermally developable material not to be sufficiently thermally developed.

Therefore, in this embodiment, the maximum amount of heat generation Hmax that the heater 32 in the drum 14 can generate while a sheet of the film denoting a thermally developable material is thermally developed and the amount of received heat M of the thermally developable material (in other words, an amount of heat which the heater gives the film during the thermal development) are let to satisfy the following formula:

$$0.07 \leqq M/Hmax \leqq 0.75 \quad (1).$$

That is, according to the relationship $0.07 \leqq M/Hmax$ (desirably $0.10 \leqq M/Hmax$ (in particular, $0.15 \leqq M/Hmax$)), it can be carried out a control to make a stable gradation reproduction at a low cost, with a duty ratio which is not made too small, and simply; further, according to the relationship $M/Hmax \leqq 0.75$ (desirably $M/Hmax \leqq 0.5$ (in particular, $M/Hmax \leqq 0.3$)), the temperature of the thermally developable material is stabilized, to carry out enough thermal development to make it possible to have a stable gradation reproduction owing to a sufficient margin of the heater, even if there is the fluctuation of heat amount with the passage of time which is taken by the film from the heater.

More concretely, while the thermally developable material is thermally developed on the drum 14, it may be preferable to control the heater 32 by the controlling electronic device 34 such the the amount of heat generation of the heater 32 satisfies the formula (1).

Here, Hmax (J) can be obtained by calculating the product among the maximum voltage (V) applied to the heater, the maximum current (A) flowing when the heater is applied with the maximum voltage and times (s) for thermally developing a sheet of the thermally developable material.

Further, M (J) can be obtained by calculating the product among an apparent specific heat obtained by heating the thermally developable material having a predetermined weight from an ambient temperature to the thermal development temperature with a constant pressure calorimeter defined in JIS K0215, the temperature difference between the ambient temperature and the thermal development temperature and the weight of the one sheet of the thermally developable material.

In the case where the amount of received heat of the film that can be thermally developed is diversified, it is appropriate that the maximum amount of heat generation Hmax that is to be generated by the heater 32 in the drum 14, the amount of received heat Mmax of the thermally developable material which has the maximum amount of received heat, and the mount of received heat Mmin of the thermally developable material which has the minimum amount of received heat, while a sheet of thermally developable material is thermally developed, are let to satisfy both of the following two inequalities:

$$Mmax/Hmax \leqq 0.75 \quad (2),$$

and $$0.07 \leqq Mmin/Hmax \quad (3).$$

That is, according to the relationship $0.07 \leqq Mmin/Hmax$, it can be carried out a control to make a stable gradation reproduction at a low cost, with a duty ratio which is not made too small, and simply; further, according to the relationship $Mmax/Hmax \leqq 0.75$, the temperature of the thermally developable material is stabilized, to carry out enough thermal development to make it possible to have a stable gradation reproduction owing to a sufficient margin of the heater, even if there is the fluctuation of heat quantity with the passage of time which is taken by the film from the heater. Further, in order to form an image having a higher quality, it is desirable that $0.10 \leqq Mmin/Hmax$ (in particular, $0.12 \leqq Mmin/Hmax$), and it is desirable that $Mmax/Hmax \leqq 0.5$ (in particular, $Mmax/Hmax \leqq 0.3$).

Incidentally, It may be supposed that Mmax is an amount of heat which the thermally developing means gives to the thermally developable material during a time period Ta necessary for the thermally developing means to thermally develop a single sheet of the thermally developable material having the maximum width (a length in the axial direction of the drum) Hmax is a maximum amount of heat that the heater can generate during the time period Ta, and Mmin is an amount of heat which the thermally developing means gives to the thermally developable material while the thermally developing means thermally develops a single sheet of the thermally developable material having the minimum width. This is obvious from the above description that the formulas (2) and (3) are defined by the ratio of Mmax to Hmax and the ratio of Mmin to Hmax. By the way, the maximum width thermally developable by the thermally developing apparatus may be determined by the width of the thermally developing apparatus (such as, in the case of the drum, a width of the drum in the axial direction), a width of a conveyance system for the thermally developable material provided in the thermally developing apparatus, and so on. On the other hand, the minimum width thermally developable by the thermally developing apparatus may be determined by a width of a conveyance system for the thermally developable material provided in the thermally developing apparatus and so on.

Further, in this embodiment, a cooling device for cooling the outer circumferential surface of the drum 14 is provided. This cooling device will be explained in the following. In FIG. 5, four cooling rollers 203 are supported in a rotatable manner by the movable frame 203*a* between the opening for supplying films 201 and the opening for ejecting films 202. The cooling rollers 203 has a length approximately equal to the length of the drum 14 in the lengthwise direction and is formed of a material having a high thermal conductivity. The movable frame 203*a* is made movable in the direction of the radius against the drum 14 by a driving device not shown in the drawing. When the movable frame moves to the inner side in the radius direction, the cooling rollers 203 are become in contact with the outer circumferential surface of the drum 14, and when it moves to the outer side in the radius direction, the cooling rollers 203 are apart from the outer circumferential surface of the drum 14.

By the aforesaid cooling device as a forced cooling means, for example, in the case where a film having a small heat capacity is supplied, the driving device moves the movable frame 203*a* to the inner side in the radius direction in order that the cooling rollers may be in contact with the outer circumferential surface of the drum 14 for a time in accordance with the heat capacity of the film F. Owing to it, because a certain amount of heat is transferred from the drum 14 to the cooling rollers, the temperature of the outer circumferential surface of the drum 14 can be kept constant regardless of the heat capacity of the supplied film F.

Further, it is thinkable to control the heating of the drum 14 by the plane-shaped heater 32 which is provided in a close contact condition with the inner circumference of the drum 14, in accordance with the information which is concerning the timing for supplying the film F to the surface of the drum 14 and has been obtained by the sensor 152 shown in FIG. 4. That is, the temperature of the outer circumferential surface of the drum 14 can be made constant to the utmost by it that, on the basis of the information obtained from the sensor 152, the quantity of the heat by the heater 32 is increased while the film F is being supplied, and the quantity of the heat by the heater 32 is decreased while the film F is not being supplied; owing to it, the unevenness of density can be controlled.

Further, it may be preferable that the target value of the heater 32 is made different corresponding to the timing in thermally developing the film F. For example, if the amount of heat generation of the heater 32 is increased on the condition that the drum 14 thermally develops the film F, and if the amount of heat generation of the heater 32 is decreased on the condition that the drum 14 does not thermally develop the film F, then the temperature of the outer circumferential surface of the drum 14 can be made uniform to the utmost, by which the unevenness of density can be suppressed. In the above, "on the condition that the drum 14 thermally develops the film F" means "from the timing at which the leading edge of the film F firstly comes in contact with the drum 14 to the timing at which the trailing edge of the film F firstly comes in contact with the drum F", and "on the condition that the drum 14 does not thermally develop the film F" is the condition during the time period other than the above". Further, the reason for specifying the target value of the heater 32 is because it is included in the both ways of temperature control, that is, carrying out the temperature control by directly measuring the temperature of the heater 32 and carrying out the temperature control by measuring the temperature of the supporting tube 36 which is adjacent to the heater 32.

Figure 9:
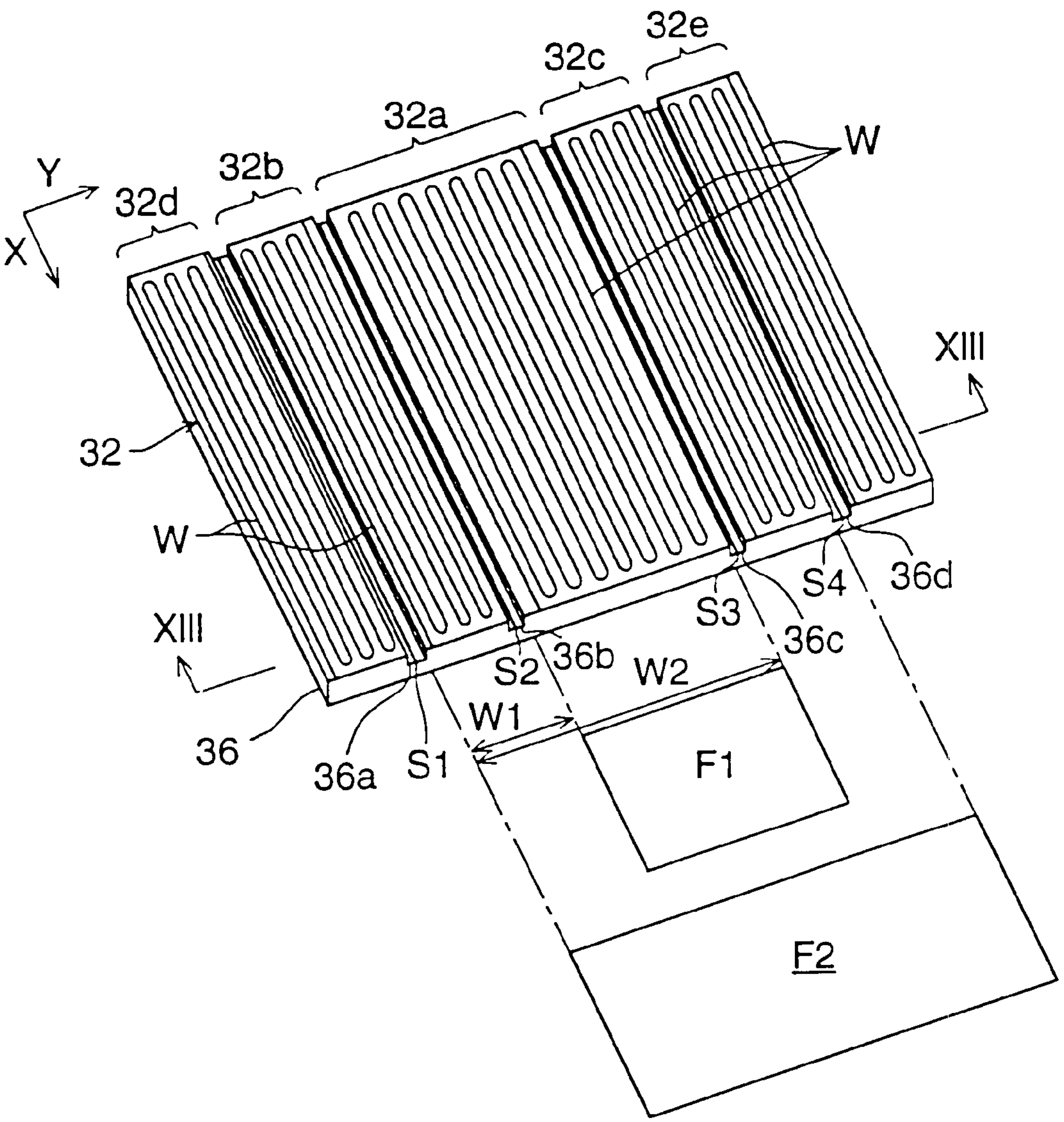
FIG. 9 is a drawing showing in a developed state the supporting tube 36 of another embodiment of the invention.

FIG. 9 is a drawing showing in a developed state the supporting tube 36 of another embodiment of the invention. The Y direction corresponds to the width direction of the film F, and the X direction corresponds to the length direction of the film F. The outer circumferential surface of the drum 14 comes to the lower surface side. The plane-shaped heater 32 is formed by putting a Nichrome wire etc. close to the surface (inner circumferential surface) of the supporting tube 36 with a fine pitch in a zigzag way, and is divided into the central area 32*a*, the side areas adjacent to it in the Y direction 32*b* and 32*c*, and the most outer areas at the farther outsides 32*d* and 32*e*. Each of the areas 32*a* to 32*e* in the heater 32 can be independently controlled for the temperature.

On the surface of the supporting tube 36 between the most outer area 32*d* and the side area 32*b*, the slot 36*a* is formed, on the surface of the supporting tube 36 between the side area 32*b* and the central area 32*a*, the slot 36*b* is formed, on the surface of the supporting tube 36 between the central area 32*a* and the side area 32*c*, the slot 36*c* is formed, and on the surface of the supporting tube 36 between the side area 32*c* and the most outer area 32*e*, the slot 36*d* is formed. In the slot 32*a*, the wire-shaped temperature sensor S1 is disposed, in the slot 32*b*, the wire-shaped temperature sensor S2 is disposed, in the slot 32*c*, the wire-shaped temperature sensor S3 is disposed, and in the slot 32*d*, the wire-shaped temperature sensor S4 is disposed. The temperature sensors S1 to S4 can measure not the temperature of the heater 32 but the temperature of the supporting tube 36 by using its own resistance varying with the temperature. Besides, the heater 32 and the temperature sensors S1 to S4 are covered by a heat insulating layer which is not shown in the drawing.

Now, if the film F1 having approximately equal width to the width of the central area 32*a* is supplied to the drum 14, the portion of the heater 32 for the central area 32*a* is controlled to increase the amount of heating because the central area is cooled by the film F1; however, the temperatures of the side areas 32*b* and 32*c* are also raised with it.

Therefore, according to this embodiment, regarding the target values of control for the portions of the heater 32 disposed in the range in the direction perpendicular to the transporting which the film F1 does not pass (that is, the side areas 32*b* and 32*c*), the values set during the time period substantially from the timing at which the leading edge of the film F1 first comes in contact with the drum 14 to the timing at which the trailing edge of the film F1 first comes in contact with the drum 14 are made to be lower than the values set during the time period other than the above; hence, it can be prevented that the temperatures of the side areas 32*b* and 32*c* are excessively raised by the heating of the central area 32*a* based on the supply of the film F1, by which the non-uniformity of the temperature of the drum 14 in the width direction of the film F1 can be suppressed. Besides, with respect to the most outer areas 32*d* and 32*e*, the target values of control in such a case is not varied or very little if varied, because the influence of the temperature of the central area is almost nothing.

Further, according to this embodiment, regarding the target values of control for the portion of the heater 32 disposed in the area including the range in the direction perpendicular to transporting which the film F1 of any size passes (the central area 32*a* in this example), the value set during the time period substantially from the timing at which the leading edge of the film F1 first comes in contact with the drum 14 to the timing at which the trailing edge of the film F1 first comes in contact with the drum 14 are made to be higher than the values set during the time period other than the above; hence, the temperature decrease in the central area 32*a* owing to the supply of the film F1 can be suppressed, by which the non-uniformity of the temperature of the drum 14 in the width direction of the film F1 can be suppressed.

It is desirable that the temperature control, which has made as the target values the value set during the time period substantially from the timing at which the leading edge of the film F1 first comes in contact with the drum 14 to the timing at which the trailing edge of the film F1 first comes in contact with the drum 14, and the value set during the time period other than the above, is made to be smoothed by ramp processing, because a smoother temperature control can be accomplished.

Next, when the film F2 having a width which is approximately equal to the width of the central area 32*a* added by the side areas 32*b* and 32*c*, the portions of the heater 32 for the central area 32*a*, and the side areas 32*b* and 32*c* are controlled to increase the amount of heating, because the central area 32*a*, and the side areas 32*b* and 32*c* are cooled by the film F2; however, the temperatures of the most outer areas 32*d* and 32*e* are raised with it.

Therefore, according to this embodiment, regarding the target values of control for the portions of the heater 32 disposed in the range in the direction perpendicular to the transporting which the film F2 does not pass (that is, the most outer areas 32*d* and 32*e*), the values set during the time period substantially from the timing at which the leading edge of the film F2 first comes in contact with the drum 14 to the timing at which the trailing edge of the film F2 first comes in contact with the drum 14 are made to be lower than the values set during the time period other than the above; hence, it can be prevented that the temperatures of the most outer areas 32*d* and 32*e* are excessively raised by the heating of the central area 32*a*, and the side areas 32*b* and 32*c* based on the supply of the film F2, by which the non-uniformity of the temperature of the drum 14 in the width direction of the film F2 can be suppressed.

Further, according to this embodiment, regarding the target values of control for the portions of the heater 32 disposed in the area including the range in the direction perpendicular to transporting which the film F2 of any size passes (the central area 32*a* and the side areas 32*b* and 32*c* in this example), the values set during the time period substantially from the timing at which the leading edge of the film F2 first comes in contact with the drum 14 to the timing at which the trailing edge of the film F2 first comes in contact with the drum 14 are made to be higher than the values set during the time period other than the above; hence, the temperature decrease in the central area 32*a* and the side areas 32*b* and 32*c* owing to the supply of the film F2 can be suppressed, by which the non-uniformity of the temperature of the drum 14 in the width direction of the film F2 can be suppressed.

Besides, as described in the above, because the control of the heater can be made in each of the portions for the respective areas 32*a* to 32*e* individually, for example, the film having a width equal to the width of the side area 32*b* w1, and also the film having a width equal to the width of the central area 32*a* and the side area 32*b* w2 can be thermally developed suitably. However, because the central area 32*a* is most unlikely to have its temperature varied, it is desirable that all the films are made to pass this area 32*a* regardless of the size.

It is desirable if the temperature control of the heater 32 is carried out using a method of controlling the ON/OFF duty ratio, because it makes it possible to simplify the control device. Further, in controlling temperature, it is desirable to carry out the control for the target value using so called an integral control or a derivative control, because of the rapid converging of the temperature. In addition, the term "an integral control or a derivative control" includes the case where values equivalent to the integral value with time or the derivative value with time such as the value averaged for the passage of time are used.

The content of photosensitive silver halides incorporated into thermally developable materials may typically be in the range of 0.75 to 25 mole percent of organic silver salts, and is preferably in the range of 2 to 20 mole percent.

The silver halides may include silver bromide, silver iodide, silver chloride, silver bromoiodide, silver chlorobromoiodide, silver chlorobromide, and the like. Silver halides are not limited to these and shapes include all photosensitive shapes such as cube, orthorhombic system, planar, tetrahedron, and the like.

Organic silver salts include every organic material comprising a silver ion reducing source. Silver salts of organic acids, particularly long chain fatty acids (having carbon atoms of 10 to 30, and preferably of 15 to 28) are preferred. Organic or inorganic silver complexes are preferred which exhibit definite stability having ligands of 4.0 to 10.0 in total, and the content is between about 5 and about 30 percent of the weight of the image forming layer.

The organic silver salts, which may be employed in the present thermally developable materials, are silver salts which are relatively stable against light and form silver images when heated at 80° C. or higher, in the presence of exposed light catalysts (for example, photographic silver halides and the like) together with reducing agents.

Preferred organic silver salts include those of organic compounds having a carboxylic group. Among those, included are silver salts of aliphatic carboxylic acids as well as silver salts of aromatic carboxylic acids. Preferred examples of silver salts of aliphatic carboxylic acids include silver behenate, silver stearate, and the like. Silver salts of a halogen atom or a hydroxyl group in aliphatic carboxylic acids may be advantageously employed. Silver salts of compounds having a mercapto group or a thione group and derivatives thereof may be employed. Further silver salts of compounds having an imino group may be employed.

Reducing agents for organic silver salts include all materials, which can reduce silver ions to metallic silver, and are preferably organic materials. Conventional photographic developers such as phenidone, hydroquinone, and catechol are preferably employed. However, phenol reducing agents are preferred. The content of the reducing agents should be between 1 and 10 weight percent of the image forming layer. When the reducing agents are incorporated into layers other than emulsion layers, the content is preferably between about 2 and about 15 weight percent, which is slightly higher than that in the emulsion layers.

APPARATUS IMPROVING EXAMPLE

An example in which the thermally developing apparatus in the abovementioned embodiment is more improved. Among the plurality of rollers 16 which are rotatable and held onto the drum, at least the leading 4 rollers firstly coming in contact with the film F fed to the drum 14 are a solid roller made of iron.

With this structure, if the shortest time interval Tmin is not longer than 27 seconds and a fist roller firstly coming in contact with the thermally developable material among the plurality of rollers is a hollow roller, the temperature of the roller is abruptly dropped. Accordingly, the temperature difference between the leading edge and the trailing edge of the thermally developable material takes place and density irregularities occur. However, if a fist roller firstly coming in contact with the thermally developable material among the plurality of rollers is a solid roller, since this roller 16 has a large thermal capacity, this roller 16 can heat the reverse surface of the film F, a temperature difference taking place between the region on which the film F located and the other region can be made smaller, and the developing time period can be made shorter. In other words, if the film F takes away the heat from the contact portion of the drum, the temperature drop may hardly occur, density unevenness that the density at the leading end of the film is different from that at the trailing end of the film may be refrained. Further, "the temperature unevenness caused by the synchronization between the rotation cycle of the drum and the feeding interval of the thermally developable materials" can be refrained. Furthermore, with the synergism by these effects, density irregularities can be refrained more preferably and the thermal development capable of obtaining an excellent image can be conducted.

Further, in the case that the shortest time interval Tmin is not longer than 27 seconds, the temperature on the surface of the elastic layer is greatly dropped only by developing a single sheet of the thermally developable material. However, if the thickness of the elastic layer is not thicker than 0.0007 (m), and a ratio of a thermal conductivity (W/m/K) to the thickness of the elastic layer is not larger than 500 ($W/m^2/K$), the heat is transmitted very well from the metallic supporting member to the surface of the elastic layer. Accordingly, the temperature drop on the surface of the elastic layer can be refrained and unevenness in temperature caused by the synchronization between the rotation cycle of the drum and the feeding interval of the thermally developable materials can be refrained. Further, with the synergism by these effects, density irregularities can be refrained more preferably.

Further, from the view point to prevent temperature unevenness in the elastic layer, it may be preferable that a thermal conductivity of the elastic layer is not smaller than 0.4 (W/m/K).

EXAMPLES

Film F will now be described below.

Silver halide-silver behenate dry soap was prepared according to a method described in U.S. Pat. No. 3,839,049. The total silver amount in the above-mentioned silver halide was 9 mole percent, while the total silver amount in silver behenate was 91 mole percent. The above-mentioned silver halide was a 0.055 μm silver bromoiodide grain emulsion comprising 2 percent of iodides.

A thermally developable emulsion was prepared by uniformly mixing 455 g of the above-mentioned silver halide-silver behenate dry soap, 26 g of toluene, 1918 g of 2-butanone, and polyvinyl butyral (B-79 manufactured by Monsanto). A mixture of the resulting thermally developable emulsion (698 g) and 60 g of 2-butanone was cooled to 12.8° C., while stirring. Added to the resulting mixture was pyridiumhydrobromideperbromide (0.92 g), and stirred for 2 hours.

Added to the resulting mixture was a calcium bromide solution (prepared by mixing CaBr (1 g) with 10 milliliters of methanol) and stirred for 30 minutes. Further added to the resulting mixture was polyvinyl butyral (158 g, B-79 manufactured by Monsanto and stirred for 20 minutes. The temperature of the resulting mixture was raised to 21.1° C., and the following was added over 15 minutes while stirring;

| | |
|---|---|
| 2-(Tribromomethylsulfone) quinoline | 3.42 g |
| 1,1-Bis(2-hydroxy-3,5-dimethylphenyl)-3,5,5-trimethylhexabe | 28.1 g |
| Solution containing 0.545 g of 5-methylmercaptobenzimidazole | 41.1 g |
| 2-(4-Chlorobenzoylbenzoic acid | 6.12 g |
| S-1 (sensitizing dye) | 0.104 g |
| Methanol | 34.3 g |
| Isocyanate (Desumoda N3300, manufactured by Mobay) | 2.14 g |
| Tetrachlorophthalic anhydride | 0.97 g |
| Phthalazine | 2.88 g |

The structure of Dye S-1 is shown below.

S-1

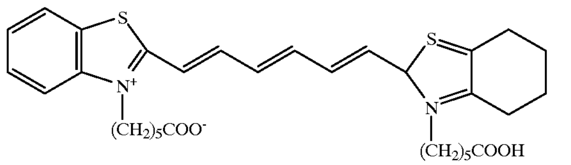

An active protective topcoat solution was prepared employing the components described below;

| | |
|---|---|
| 2-Butanone | 80.0 g |
| Methanol | 10.7 g |
| Cellulose acetate (CAB-171-155, manufactured by Eastman Chemicals) | 8.0 g |
| 4-Methylphthalic acid | 0.52 g |
| MRA-1, Motoru reducing agent, tertiary polymer of ethylperfluorooctanesulfonylamidoethyl methacrylate/hydroxyethyl methacrylate/acrylic acid in a weight ratio of 70:20:10 | 0.80 g |

The resulting thermally developable emulsion and top coat composition were simultaneously coated onto a 0.18 mm blue-tinted polyester film substrate. A knife coater was constituted in such a manner that two bars and knives for simultaneous coating were provided 15.2 cm apart from each other. During coating the silver trip layer and top coat, multilayer coating was carried in such a manner that the silver emulsion was poured onto the film substrate prior to a rear knife and the top coat was poured onto the film substrate prior to a front bar.

The resulting film was pulled forward so that subsequently, both layers were simultaneously coated. This was achieved by carrying out one multilayer coating method. The coated polyester substrate was dried at 79.4° C. for 4 minutes. The knives were adjusted so that the silver layer yielded a dried layer weight of 23 g per $m^2$ and the top coat yielded a dried layer weight of 2.4 g per $m^2$.

(EXPERIMENT)

EXPERIMENT 1

By using the above-described thermally developing apparatus, the films F, which have been sampled from various lots and have passed a time period for which they have been stored in the unexposed state under various conditions, are exposed through a predetermined wedge which is corrected for the storage in the unexposed state and for the passage of time (test exposure), to measure the density and γ, are inspected if the desired density and γ are presented, and are evaluated by the criteria described in the following:

A: all present the desired density and γ;

B: some present a density and/or γ varying from the desired one but within the allowable range;

C: some present a density and/or γ varying from the desired one, which poses a problem;

D: some do not present the desired density and γ obviously, which poses a problem; and M/H: (heat quantity taken by the film F)/(heat quantity generated by the heater 32).

The result of the experiment is shown in the following:

TABLE 1

| | M/H | STABILITY OF DENSITY, | STABILITY OF γ, | COST | NOTE |
|---|---|---|---|---|---|
| EXAMPLE 1 | 0.04 | B | B | HIGH | Mmin |
| | 0.05 | B | B | HIGH | Mmax |
| EXAMPLE 2 | 0.16 | A | A | LOW | Mmin |
| | 0.20 | A | A | LOW | Mmax |
| EXAMPLE 3 | 0.8 | C | C | LOW | Mmin |
| | 1.0 | C | C | LOW | Mmax |

According to this invention, the reproduction of gradation in thermally developable materials can be made suitably.

What is claimed is:

1. A thermally developing apparatus for thermally developing a thermally developable material shaped in a sheet form by heating the thermally developable material to at least 80° C. comprising:

a thermally developing device comprising a heating member having a heating surface moved in a predetermined direction, a supplying section at which the thermally developable material is loaded on the heating surface, a discharging section at which the thermally developable material is removed from the heating surface and a heater to heat the heating member, wherein the thermally developing device thermally develops the thermally developable material by heating the thermally developable material with the heating surface while moving the heating surface from the supplying section to the discharging section;

a sensor to detect the temperature of the heating member; and a controller to control the heater in accordance with the detected temperature of the heating member in such a way that the heater conducts ON-mode to generate heat or OFF-mode to stop generating heat;

wherein the heater has a heating capacity to satisfy the following formula:

$$0.07 \leqq M/Hmax \leqq 0.75$$

where M is an amount of heat taken by the thermally developable material during a developing time period to thermally develop a single sheet of the thermally developable material, and Hmax is a maximum amount of heat that the heater can generate on the ON-mode during the developing time period.

2. The thermally developing apparatus of claim 1 further comprising:

a cooler for cooling the thermally developing device.

3. The thermally developing apparatus of claim 2 wherein the cooler forcedly cools the thermally developing device.

4. The thermally developing apparatus of claim 1 further comprising a conveyor to convey the thermally developable material to the supplying section of the thermally developing device wherein the controller sets a target temperature for the heater and changes a set value of the target temperature in accordance with a timing when the conveyor conveys the thermally developable material to the supplying section.

5. The thermally developing apparatus of claim 4 wherein the thermally developing apparatus develops any one of plural thermally developable materials different in size and the heating surface is divided into plural heating regions which are selectively used in accordance with the size of a thermally developable material, and wherein the controller sets a target temperature for each of the plural heating regions and a set value of the target temperature for a region where all of the plural thermally developable materials passes is set higher than that for other regions.

6. The thermally developing apparatus of claim 4 wherein the controller sets a first set value of the target temperature during a period from a time that a leading edge of the thermally developable material firstly is loaded on the heating surface by the conveyor to a time that a trailing edge of the thermally developable material firstly is loaded on the heating surface, and sets a second set value of the target temperature during a period to remove the thermally developable material from the heating surface, and wherein the controller makes the second set value different from the first set value and changes gradually from the first set value to the second set value.

7. The thermally developing apparatus of claim 1 wherein the heating member comprises a metallic supporting member having an outer surface and inner surface and the heater is a plane-shaped heater provided so as to come in close contact with the inner surface of the supporting member.

8. The thermally developing apparatus of claim 1 wherein the controller controls the heater by using at least one of a value corresponding to a time integral value of the temperature detected by the sensor.

9. The thermally developing apparatus of claim 1 wherein the controller controls the heater by using a value corresponding to a time differential value of the temperature detected by the sensor.

10. The thermally developing apparatus of claim 1 wherein the controller controls the heater by a duty ratio of the ON-mode to the OFF-mode.

11. The thermally developing apparatus of claim 1 wherein the heating member has an inner section covered with a heat insulating member and the heater is provided in the inner section.

12. The thermally developing apparatus of claim 1 wherein the heating member is a rotating member which heats the thermally developable material while rotating on a condition that the thermally developable material is loaded so as to come in close contact with a heating surface of the rotating member.

13. The thermally developing apparatus of claim 12 wherein the rotating member is divided in the axial direction into plural regions and each of the plural regions is provided with the heater.

14. The thermally developing apparatus of claim 1 wherein the heating member heats the thermally developable material with a development temperature higher than a lowest development temperature for the developing time period.

15. The thermally developing apparatus of claim 1 further comprising:

a rotatable roller urged onto the heating surface.

16. The thermally developing apparatus of claim 1 wherein an elastic layer having a thickness of 0.1 mm or more is provided on the heating surface of the heating member.

17. The thermally developing apparatus of claim 16 wherein a ratio of a thermal conductivity to the thickness of the elastic layer is at least 0.15 (W/m/° K/mm), and the heating member comprises a metallic supporting member to support directly or indirectly the elastic member.

18. The thermally developing apparatus of claim 17 wherein the elastic layer has the thickness of 2 mm or less and the thermal conductivity of 0.3 W/m/° K or more.

19. The thermally developing apparatus of claim 1 wherein the thermally developing apparatus develops any one of plural thermally developable materials different in size which includes a first thermally developable material having a largest width and a second thermally developable material having a smallest width and the heating capacity of the heater satisfying the following formulas:

$$M1/Hmax \leqq 0.75,$$

and $$0.07 \leqq M2/Hmax$$

where M1 is an amount of heat taken by the first thermally developable material during a first thermally developing time period to thermally develop a single sheet of the first thermally developable material, M2 is an amount of heat taken by the second thermally developable material during a second thermally developing time period to thermally develop a single sheet of the second thermally developable material, and Hmax is a maximum amount of heat that the heater can generate on the ON-mode during the first developing time period.

20. The thermally developing apparatus of claim 19 wherein M1 is the maximum amount of heat taken by a thermally developable material among the plural thermally developable materials and M2 is the minimum amount of heat taken by a thermally developable material among the plural thermally developable materials.

* * * * *